United States Patent
Anderson

(10) Patent No.: US 10,937,240 B2
(45) Date of Patent: Mar. 2, 2021

(54) AUGMENTED REALITY BINDINGS OF PHYSICAL OBJECTS AND VIRTUAL OBJECTS

(71) Applicant: INTEL CORPORATION, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/862,280

(22) Filed: Jan. 4, 2018

(65) Prior Publication Data

US 2019/0043260 A1    Feb. 7, 2019

(51) Int. Cl.
*G06T 19/20*    (2011.01)
*G06F 3/01*    (2006.01)
(Continued)

(52) U.S. Cl.
CPC ............ *G06T 19/006* (2013.01); *G06F 3/011* (2013.01); *G06F 3/017* (2013.01);
(Continued)

(58) Field of Classification Search
CPC ........................ G06T 19/006; A63F 13/20–217
See application file for complete search history.

(56) References Cited

U.S. PATENT DOCUMENTS

| | | |
|---|---|---|
| 5,443,260 A | 8/1995 | Stewart et al. |
| 7,578,742 B2 | 8/2009 | Miyamoto et al. |

(Continued)

FOREIGN PATENT DOCUMENTS

| | | |
|---|---|---|
| CN | 1941982 A | 4/2007 |
| CN | 101952818 A | 1/2011 |

(Continued)

OTHER PUBLICATIONS

Piumsomboon, Thammathip, Adrian Clark, and Mark Billinghurst. "Physically-based interaction for tabletop augmented reality using a depth-sensing camera for environment mapping." Proc. Image and Vision Computing New Zealand (IVCNZ-2011) (2011): 161-166. (Year: 2011).*

(Continued)

*Primary Examiner* — Ryan McCulley
(74) *Attorney, Agent, or Firm* — Schwabe, Williamson & Wyatt, P.C.

(57) ABSTRACT

Systems, apparatus, and computer-readable media for managing data storage for generating virtual bindings are provided. In embodiments, a user may perform one or more gestures and/or voice commands to create virtual bindings with physical objects, where the created virtual bindings may take on attributes and create/perform actions based on attributes of the physical objects. A projection device may recognize the physical objects and cause the bindings and/or projected virtual objects to perform various actions in response to different user gestures and/or voice commands. Additionally, the system may instruct some physical objects (e.g., robots, electromechanical devices, etc.) in response to user gestures/voice commands to cause those physical devices to perform various actions. Other embodiments are described and/or claimed.

25 Claims, 8 Drawing Sheets

(51) Int. Cl.
*G06T 19/00* (2011.01)
*G06K 9/00* (2006.01)

(52) U.S. Cl.
CPC ..... *G06K 9/00335* (2013.01); *G06K 9/00671* (2013.01); *G06T 19/20* (2013.01)

(56) References Cited

U.S. PATENT DOCUMENTS

| | | | |
|---|---|---|---|
| 7,855,713 | B2 | 12/2010 | Egashira |
| 8,077,157 | B2 | 12/2011 | Sengupta et al. |
| 8,194,043 | B2 | 6/2012 | Cheon et al. |
| 8,350,814 | B2 | 1/2013 | Kim et al. |
| 8,717,318 | B2 | 5/2014 | Anderson et al. |
| 8,736,583 | B2 | 5/2014 | Anderson et al. |
| 9,330,478 | B2 | 5/2016 | Anderson |
| 9,360,933 | B2 | 6/2016 | Anderson et al. |
| 9,418,479 | B1 | 8/2016 | Worley, III et al. |
| 9,557,819 | B2 | 1/2017 | Anderson |
| 9,846,970 | B2 | 12/2017 | Anderson |
| 10,168,873 | B1* | 1/2019 | Holz ............... G06F 3/04842 |
| 2002/0041327 | A1 | 4/2002 | Hildreth et al. |
| 2004/0193413 | A1 | 9/2004 | Wilson et al. |
| 2004/0239670 | A1 | 12/2004 | Marks |
| 2005/0023763 | A1 | 2/2005 | Richardson |
| 2005/0093868 | A1 | 5/2005 | Hinckley |
| 2007/0126696 | A1 | 6/2007 | Boillot |
| 2008/0219509 | A1 | 9/2008 | White et al. |
| 2008/0309626 | A1 | 12/2008 | Westerman et al. |
| 2008/0310707 | A1 | 12/2008 | Kansal et al. |
| 2009/0135135 | A1 | 5/2009 | Tsurumi |
| 2009/0228841 | A1 | 11/2009 | Hildreth |
| 2009/0289900 | A1* | 11/2009 | Lavski ............... A63F 13/06 345/173 |
| 2010/0188352 | A1 | 7/2010 | Ikeda |
| 2010/0195869 | A1 | 8/2010 | Geiss |
| 2010/0241998 | A1 | 9/2010 | Latta et al. |
| 2010/0302015 | A1 | 12/2010 | Kipman et al. |
| 2011/0107216 | A1 | 5/2011 | Bi |
| 2011/0173574 | A1 | 7/2011 | Clavin |
| 2011/0175920 | A1 | 7/2011 | Ieperen |
| 2011/0175932 | A1 | 7/2011 | Yu et al. |
| 2011/0179368 | A1 | 7/2011 | King et al. |
| 2011/0193778 | A1 | 8/2011 | Lee et al. |
| 2011/0197147 | A1 | 8/2011 | Fai |
| 2011/0199291 | A1 | 8/2011 | Tossell et al. |
| 2011/0273562 | A1 | 11/2011 | Dawe et al. |
| 2012/0169646 | A1 | 7/2012 | Berkes et al. |
| 2012/0220385 | A1 | 8/2012 | Richardson |
| 2012/0236025 | A1 | 9/2012 | Jacobsen et al. |
| 2012/0249429 | A1 | 10/2012 | Anderson et al. |
| 2012/0249443 | A1* | 10/2012 | Anderson ............... A63F 13/06 345/173 |
| 2012/0295708 | A1 | 11/2012 | Hernandez-Abrego et al. |
| 2013/0278499 | A1* | 10/2013 | Anderson ............... G06F 3/01 345/156 |
| 2013/0278633 | A1 | 10/2013 | Ahn et al. |
| 2013/0286004 | A1* | 10/2013 | McCulloch ........... G06T 19/006 345/419 |
| 2013/0290876 | A1* | 10/2013 | Anderson ............. G06T 19/006 715/761 |
| 2013/0342570 | A1 | 12/2013 | Kinnebrew et al. |
| 2014/0004969 | A1 | 1/2014 | Jang et al. |
| 2014/0071069 | A1* | 3/2014 | Anderson ............... A63F 13/06 345/173 |
| 2015/0123965 | A1 | 5/2015 | Molyneaux et al. |
| 2015/0375128 | A1* | 12/2015 | Villar ..................... A63H 30/02 446/454 |
| 2016/0067593 | A1* | 3/2016 | Yim .................... A63F 3/00643 463/31 |
| 2017/0031502 | A1* | 2/2017 | Rosenberg ............ G06F 3/017 |
| 2017/0038829 | A1* | 2/2017 | Lanier .................. H04L 65/403 |
| 2017/0178406 | A1 | 6/2017 | Anderson et al. |
| 2017/0372518 | A1* | 12/2017 | Rehmeyer ............ G03H 1/2249 |
| 2018/0246562 | A1* | 8/2018 | Peterson ................ G06F 3/011 |
| 2018/0246698 | A1* | 8/2018 | Huang ................... G06F 3/165 |
| 2019/0033058 | A1* | 1/2019 | Tsurumi ................ G01B 11/02 |

FOREIGN PATENT DOCUMENTS

| | | |
|---|---|---|
| CN | 102184020 A | 9/2011 |
| KR | 10-2000-0075608 A | 12/2000 |
| KR | 20110117114 A | 10/2011 |
| TW | 201019241 A | 5/2010 |
| WO | 9934327 A3 | 9/1999 |
| WO | 2011004135 A1 | 1/2011 |
| WO | 2012011044 A1 | 1/2012 |
| WO | 2013119221 A1 | 8/2013 |
| WO | WO2014-053346 A1 | 4/2014 |

OTHER PUBLICATIONS

Song, Peng, Hang Yu, and Stefan Winkler. "Vision-based 3D finger interactions for mixed reality games with physics simulation." Proceedings of the 7th ACM SIGGRAPH international conference on virtual-reality continuum and its applications in industry. ACM, 2008. (Year: 2008).*
Van Velthoven, Lieven. "Room Racers: Design and Evaluation of a Mixed Reality Game Prototype." Master's thesis, Media Technology, Leiden University, the Netherlands (2012). (Year: 2012).*
English Translation of the Notice of Preliminary Rejection for KR Counterpart Application No. 2014-7017149 5 pgs., (dated Jul. 17, 2015).
European Search Report for EP Counterpart Application No. 11876258. 2, 6 pgs., (dated Jul. 27, 2015).
Supplementary EP Search Report, EP Application No. 11876258, 21 pages.
Gebhardt, Sascha , et al., MI Hauptseminar Sommersemester 2009 "Interactive Surfaces" LFE Medieninformatik @Bullet Sasha Gebhardt Superimposed Displays, XP055249528, Retrieved on Apr. 20, 2018, from URL< https://www.medien.ifi.lmu.de/lehre/ss09/hs/presentations/02_sascha_gebhardt.pdf>>, (dated Jan. 1, 2009).
International Search Report and Written Opinion dated Oct. 12, 2012, issued in related International Application No. PCT/US2012/024267, 9 pages pages.
International Search Report and Written Opinion dated Feb. 22, 2017 for International Application No. PCT/US2016/060166, 16 pages.
Non-Final Office Action dated Sep. 4, 2013, issued in U.S. Appl. No. 13/335,866.
Kane et al., "Bonfire: A Nomadic System for Hybrid Laptop-Tabletop Interaction", Proceedings of the 22nd Annual ACM Symposium on User Interface Software and Technology, Oct. 4-7, 2009, pp. 129-138.
Bonfire from Intel Labs Seattle and University of Washington: Hybrid Laptop-Tabletop Interaction, Available al:<http://www.youtube.com/watch?v=mgtT o 7 JD _dc>.
"Kitty Cat Coin Toss", available at: <http:/ ii phone. wareseeker.com/kitty-cat-coin-toss.app/42e312be25.
Benko et al., "DepthTouch: Using Depth-Sensing Camera to Enable Freehand Interactions On and Above the Interactive Surface", IEEE Work-shop on Tabletops and Interactive Surfaces, Oct. 1-3, 2008, 8 pages.
Non-Final Office Action dated Jul. 24, 2013, issued in U.S. Appl. No. 13/335,866.
U.S. Appl. No. 15/278,662, entitled "Augmented Reality Creations With Interactive Behavior and Modality Assignments," filed Sep. 28, 2016.
U.S. Appl. No. 15/280,192, entitled "Toys That Respond to Projections," filed Sep. 29, 2016.
Non-Final Office Action dated Jul. 6, 2015, issued in related U.S. Appl. No. 13/977,654, 12 pages.
Non-Final Office Action dated Feb. 24, 2016, issued in related U.S. Appl. No. 13/977,654, 8 pages.

* cited by examiner

AUGMENTED REALITY BINDINGS OF PHYSICAL OBJECTS AND VIRTUAL OBJECTS

TECHNICAL FIELD

The present disclosure relates to the field of augmented reality systems and devices, and in particular, to apparatuses, methods, and storage media for creating and managing virtual bindings between augmented reality objects and physical objects.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Augmented reality (AR) systems include devices that augment a user's view of a physical (i.e., "real-world") environment with computer-generated sensory inputs, such as sound, video, graphics, haptic feedback, etc. Existing AR systems do not provide mechanisms that attach or associate physical objects with the computer-generated sensory inputs.

BRIEF DESCRIPTION OF THE DRAWINGS

The included drawings are for illustrative purposes and serve to provide examples of possible structures and operations for the disclosed embodiments. The drawings in no way limit any changes in form and detail that may be made by one skilled in the art without departing from the spirit and scope of the disclosed concepts.

DETAILED DESCRIPTION

Figure 1:
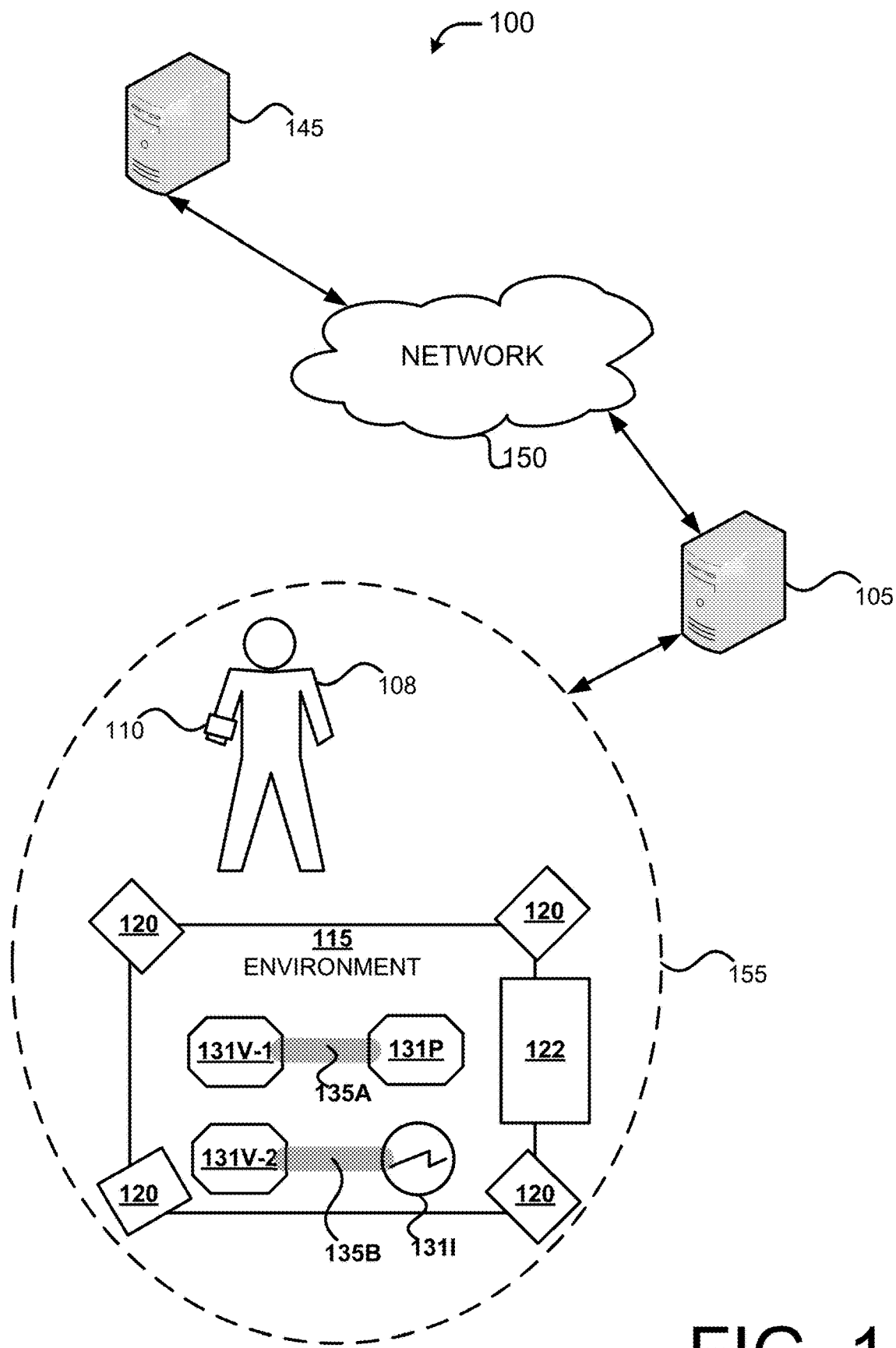
FIG. 1 illustrates an environment in which various embodiments may be practiced.

Disclosed embodiments are related to user interaction devices for interacting with augmented reality, and in particular, technologies that allow a user to interact with virtual objects in a user domain (i.e., "real-world"). Currently available augmented reality systems may allow users to interact with virtual objects displayed on a display device (e.g., televisions, tablet computers, etc.), where the user may interact with the virtual objects by performing various gestures that are captured by a motion capture device. In embodiments, a user may perform one or more gesture to create virtual bindings with real (physical) objects, where the created virtual bindings may take on attributes and create/perform actions based on the real objects. A projection device may recognize the real (physical) objects and cause the bindings and/or projected virtual objects to perform various actions in response to different user gestures and/or voice commands. Additionally, the system may send instructions to instrumented physical objects (e.g., robots, electromechanical devices, etc.) in response to user gestures/voice commands to cause those physical devices to perform various actions.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Referring to the figures, FIG. 1 illustrates an arrangement 100 in which various embodiments may be practiced. Arrangement 100 includes augmented reality (AR) platform 105, network 150, local network 155, and one or more servers 145. The local network 155 may include a user 108 with a wearable device 110 and an environment 115. The environment 115 may include sensor array 120, output array 122, and objects 131.

The AR platform 105 may be one or more computer devices capable of detecting motions and/or objects, generating virtual bindings and/or virtual objects based on the detected objects and/or motions, and cause the virtual bindings and virtual objects to be displayed within the environment 115 according to the various embodiments herein. In this regard, the AR platform 105 may include processor(s), memory device(s), communication device(s), and/or other like components to perform the functionality of the embodiments herein. An example implementation of the AR platform 105 is shown and described with regard to FIG. 2.

The AR platform 105 may detect (e.g., utilizing data obtained from sensors of the sensor array 120 and/or wearable device 110) one or more user interactions to create virtual bindings 135A-B, connect or associate the bindings 135A-B to physical ("real") object 130P (e.g., physical object 131P), virtual objects 131V, and/or instrumented object 131I. The user interactions may include air and touch gestures performed by user 108 and/or voice commands issued by the user 108. For example, the user 108 may use voice commands to assign attributes to a binding 135 or to choose events and physics for specific sessions and setups, and the user 108 may use gestures to select and manipulate a binding 135.

In the example of FIG. 1, the user 108, via interaction with AR platform 105, created virtual binding 135A and connected or associated the binding 135A with virtual object 131V-1 and physical object 131P. Additionally, the user 108, via interaction with AR platform 105, created virtual binding 135B and connected or associated the binding 135B with virtual object 131V-2 and instrumented object 131I. The virtual bindings 135 may take on attributes and/or perform actions based on detected physical/instrumented objects. In embodiments, the attributes and/or actions may be based on a context of the environment 115, other objects and bindings in the environment, and/or a relation between various objects and bindings in the environment 115. The "context" of the environment 115 may refer to interrelated conditions or circumstances in which a setting or arrangement of objects 131 in the environment 115 exists or occurs, and may be based on various events, conditions, criteria, etc. that preceded that setting or arrangement.

The AR platform 105 may control sensors of sensor array 120 to recognize the objects 131 and cause the bindings 135 to behave with appropriate physical attributes (e.g., according to the laws of physics) and other meaningful responses. The AR platform 105 may also interpret user gestures (including air and touch gestures), voice commands, and/or other user inputs to assign attributes to the bindings. For example, when the user 108 performs a pulling or dragging gesture to pull on a binding 135, the AR platform 105 may assign various physical properties to the binding 135, such as elasticity, stiffness, hardness, fluidity, color, etc. based on the environmental context. In another, example, the user 108 may perform a drawing type gesture, for example, using a finger, to draw a specific type of binding 135, such as a binding with a specific shape or size. Additionally, the AR platform 105 may communicate with instrumented objects 131I based on user gestures, etc. such that the instrumented objects 131I perform actions corresponding to the user gestures.

The environment 115 may be any type of setting or area in/on which the user 108 may interact with physical, instrumented, and virtual objects. In some embodiments, the environment 115 may be a table, a physical platform, or other like furniture object, and various virtual images may be projected onto a surface of the table, the physical platform, etc. In some embodiments, the environment 115 may be a room, or an area within a room, into which virtual images may be projected (e.g., for providing a touchless user interface (TUI)). In some embodiments, the environment 115 may be a table-top display device where various virtual images are displayed by projecting images/light upwards toward the user. In one example, the environment 115 may include a holographic display system that that utilizes light diffraction to create a virtual three-dimensional (3D) image of one or more virtual objects 131V. In alternative embodiments, the user 108 may use AR headgear, monocular or binocular optical head-mounted display (OHMD), a 3D television with 3D glasses, or the like, to view the environment 115 rather than using a table or object-based type of environment as discussed previously. The AR platform 105 and the environment 115 may be collectively referred to as an "AR system" or the like.

As shown, the environment 115 may include the sensor array 120 and output array 122. The sensor array 120 may include one or more sensors (e.g., sensors 220 shown and described with regard to FIG. 2), which may be devices capable of sensing, detecting, capturing, measuring, events or changes in the physical environment 115, and convert the sensed events or environmental changes into a signal and/or sensor data, which can be read by a computing device. The sensors of the sensor array 120 may include, inter alia, one or more image/motion detection/capture device(s) (e.g., cameras, depth sensors, infrared cameras, etc.), accelerometer(s), gyroscope(s), gravimeter(s), magnetometer(s), proximity sensor(s), ambient light sensor(s), microphone(s), pressure sensor(s), a capacitive surface, a conduction detector, a detector of electromagnetic energy (such as radiofrequency (RF), infrared, visible light, etc.), a vibration detector, a proximity detector, a fiducial marker detector, and the like. In some implementations, the sensor array 120 may include a stereo camera system comprising two or more cameras whose relation to one another is known, and/or a depth sensor/camera or 3D scanner system (e.g., a resonant MEMS micro mirror device, a micro-opto-electromechanical system (MOEMS), a time of flight (ToF) camera/sensor, etc.) that uses structured light, ToF, and/or infrared laser projection, triangulation techniques to scan and analyze a real-world object or environment to collect data on its shape and possibly its appearance (e.g., color, texture, etc.). In one example implementation, the sensor array 120 may comprise a single housing with a stereo camera system with onboard image processing circuitry, where the image processing circuitry may measure the distance between pixels on any objects 131 that fall within the fields of view of the cameras of the stereo camera system. Examples of the sensor array may include an Intel® RealSense™ Depth Camera, a Microsoft® Kinect™ sensor, a Structure Sensor by Occipital, Inc., a Google® Tango device, a Motion Contrast 3D Scanning (MC3D) camera, or some other like devices.

Sensors of sensor array 120 may detect, for example, digital or physical characteristics of physical objects 131P and/or instrumented objects 131I in the environment 115. These characteristics may comprise, for example, a time, an orientation, a position, a rate of change in position/orientation, a relative position, encoded information, color, shape, size, sound, materials, or other like physical properties. The position, orientation, and rate of change in position/orientation may be relative to the sensors, relative to other objects (e.g. physical, virtual, or instrumented objects), or relative to an external frame of reference. In various embodiments, the detected characteristics may be used by the AR platform 105 to emulate various physical characteristics/properties of the bindings 135 and/or virtual objects 131V. The detected characteristics may also be used to trigger events or transition a state of play, such as by generating and displaying additional or alternative virtual objects 131V or instructing instrumented objects 131I to perform one or more actions. In embodiments, the characteristics may be stored by the AR platform 105 as object profile 322 and/or tracking history 323 records (see e.g., FIG. 3).

Output array 120 may include one or more devices that are configured to convert electronically generated signals/data into a medium that is comprehendible by human sensory systems. Various output modalities may be used, including visual, haptics, audio, and chemical. For example, user interactions (e.g., gestures or voice commands) on bindings 135 may cause the AR platform 105 to generated and display various images, emit sound effects or haptic vibrations on objects 131 and surfaces of the environment 115, and/or emit a gas, chemical scents, etc. In embodiments, the output devices of the output array 120 may include display devices, audio output devices, tactile output devices, chemical emitting device, and the like. The display devices may be any type of output device that is able to present information in a visual form based on received electrical signals. In most embodiments, the display device may be an image or video projector that may project images or moving images onto a display surface of environment 115 based on received signals (e.g., picture generating units (PGUs) 230 and holographic optical elements (HOEs) 231 shown and described with regard to FIG. 2). In other embodiments, the display devices may include monitors, such as Light Emitting Diode (LED) display devices, organic LED (OLED) display devices, Liquid Crystal Display (LCD) devices, quantum dot display devices, and/or the like. The display devices may be used to display one or more images associated with virtual objects 131V-1 and 131V-2. The tactile output devices may include electro-mechanical component array (EMCs) (e.g., EMCs 222 shown and described with regard to FIG. 2), may control the environment 115 and/or the objects 131 in the environment 115.

Network 150 and local network 155 may comprise computers, network connections among the computers, and software routines to enable communication between the computers over network connections. In this regard, the network 150 and local network 155 may each comprise one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 150 or local network 155 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 150 and/or local network 155 may require that the computers execute software routines which enable, for example, the seven layers of the OSI model of computer networking or equivalent in a wireless (cellular) phone network Network 150 may be used to enable relatively long-range communication such as, for example, between the one or more servers 145 and AR platform 105 or a component within local network 155. The network 150 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. Examples of such networks and/or protocols are discussed infra with regard to FIG. 2. In such embodiments, the network 150 may be associated with network operator who owns or controls equipment and other elements necessary to provide network-related services, such as one or more base stations or access points, one or more servers for routing digital data or telephone calls (for example, a core network or backbone network), etc.

Local network 155 may be used to enable relatively short-range communication such as, for example, between AR platform 105 and sensors of sensor array 120, output devices of output array 122, instrumented objects 131I, wearable device 110, or the like. The local network 155 may represent a short-range network, such as person-to-person (P2P) or personal area network (PAN) (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like), or could represent any other network or protocols as discussed herein.

The one or more servers 145 may be one or more hardware computing devices that may include one or more systems and/or applications for providing one or more services to users (e.g., user 108 and/or AR platform 105) over a network (e.g., network 150). The one or more servers 145 may include one or more processors, one or more memory devices, one or more network interfaces, etc. Additionally, one or more servers 145 may be a single physical hardware device, or may be physically or logically connected with other network devices. Moreover, one or more servers 145 may be connected to, or otherwise associated with one or more data storage devices (not shown). The server(s) 145 may include an operating system (OS) that may provide executable program instructions for the general administration and operation of servers, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

In embodiments, the services provided by the server(s) 145 may include accounting for, or otherwise operating an immersive gaming experience. For example, the services may include providing data to be used for generating virtual objects 131V, bindings 135, and/or instructions for instrumented objects 131I, as well as and manipulating the objects/bindings based on user interactions, object/binding attributes, context, gameplay rules, subscription data, and/or other like criteria or parameters. The services may include creating, storing, and altering/adjusting user profiles associated with a user 108, games, etc. The user profiles may indicate game criteria or parameters associated with the user in connection with a game, or in relation to multiple users playing one or more games. The services may also include tracking or account for gameplay points/property and/or gameplay effects, such as virtual currency/property/points tallies (including points, health, damage loss, power levels, "magical power", etc.), a virtual or physical on/off, open/close, and/or lock/unlock indication, physical dispense amounts, virtual dispense amounts, and/or the like. The game play properties may be represented as numerical values, character strings, etc. that is/are accounted for by the server(s) 145, and may increase or decrease based on various factors such has the passage of time, time of day and/or date, completing tasks, positions/orientations (or changes in positions/orientations) of various objects in the environment 115, relation (or changes in relations) of various objects with one another in the environment 115, and/or the like. The server(s) 145 may also perform or facilitate user setup and play registration, including associating one or more physical, virtual, and/or instrumented objects with authorized users 108, initiate and control software and/or firmware updates of the elements or devices within the environment 115, record the results associated with one or more games, provide requested user authentication credentials, provide content management, provide user interfaces and/or control elements for setting up new games and/or modifying existing games, and/or perform computationally intensive tasks for the AR platform 105 and/or the components/devices within environment 115. In some embodiments, some or all of the functionality performed by the server(s) 145 may be implemented by the AR platform 105, or vice versa.

The virtual objects 131V and bindings 135 may be one or more images, animations, video clips, holograms, holographic optical elements, etc. that are displayed based on user interactions (e.g., gestures, voice commands, etc.), various physical objects 131P in the environment 115, various instrumented objects 131I in the environment 115, various and bindings 135 in the environment 115, one or more in-game criteria, and/or the like. The virtual objects 131I and bindings 135 may be generated and rendered (i.e., displayed and/or projected) by an image generation module and/or a rendering module (e.g., AR engine 331 and/or AR renderer 333 as described with regard to FIG. 3) according to one or more known methods for generating computer graphics. For instance, the images associated with virtual objects 131I and bindings 135 may be a two dimensional (2D) pixel graphic generated using a raster imaging application, a sprite graphic generated using a cascading style sheet (CSS), a vector graphic generated according to the scalable vector graphics (SVG) standard, a three dimensional (3D) graphic generated using one or more known 3D modeling and/or 3D rendering applications, computer-generated imagery (CGI), etc. In some implementations, the virtual objects 131I may be described using Extensible Markup Language (XML), JavaScript Object Notation (JSON), Augmented Reality Markup Language (ARML), and/or other like data structure or language, or variants thereof. As alluded to previously, the virtual objects 131I and bindings 135 may be generated and rendered based on a 2D or 3D model according to one or more known methods, such as by obtaining object data and/or image data from one or more data packets, processing the object data and/or image data into a scene file taking into account geometry information, viewpoint information, scene, information, texture information, lighting information, shading information, feature information, visual assets information, anchors (e.g., geometries, trackables, relative-to, screen anchors, etc.), and/or the like, and outputting the processed data to a digital image file, a raster image file, and the like. The hardware devices used by the image generation module and the rendering module e.g., AR engine 331 and/or AR renderer 333 as described with regard to FIG. 3) may include a graphics processing unit (GPU) and/or any other like hardware device that is configured to perform complex rendering calculations. The generated images may be displayed according to one or more known video mapping or projection mapping methods, one or more known projection methods, and/or any other like known method for displaying images.

Although both virtual objects 131I and bindings 135 may be generated and/or rendered in a same or similar manner, the virtual objects 131I and bindings 135 may be different in some respects. In embodiments, the virtual objects 131I may be digital images (including real and virtual images) that represent real-world objects, whereas bindings 135 may be digital images (including real and virtual images) that bind to or are otherwise associated with one or more objects (including physical objects 131P, virtual objects 131V, instrumented objects 131I, and/or other bindings 135) to one or more other objects or to nothing at all. In embodiments, the bindings may take on attributes based on the other objects in the environment 115 (or relations therebetween), user interactions, or the like as detected by the sensors of the senor array 120. In embodiments, the attributes may define (or may be used to define) various physical attributes that a binding 135 is to emulate.

In embodiments, the AR platform 105 may enable the user 106 to select one of a plurality of virtual binding types with different physics aspects, allowing the user 108 to select behaviors and appearances of the binding 135. In one example, the AR platform 105 may project the plurality of binding types, and the user 108 may perform one or more gestures to select a desired one of the binding types. Moreover, multiple bindings 135 and objects 131 may be used simultaneously by multiple users 108.

The physical objects 131P may be any type of object that is physically present in the environment 115, and may include, for example, cards (e.g., playing cards, collectable cards, trading cards, etc.), analog toys (e.g., action figures/dolls, construction sets or construction set pieces, toy vehicles, puzzles or puzzle pieces, board games, etc.), furniture, office supplies (e.g., writing implements, hole punches, stamps, staplers, staples, paper clips, etc.), sports equipment (e.g., baseball bats, baseball gloves, golf clubs, golf balls, tennis rackets, tennis balls, etc.), and/or other like physical objects. Although the aforementioned examples are inanimate objects, embodiments herein may also be applicable to animate objects (e.g., robots or other mechanical devices) and/or living organisms (e.g., dogs, cats, or other types of pets).

Instrumented objects 131I may be physical objects that are embedded with hardware components and/or electromechanical devices (EMCs) that enable the instrumented objects 131I to perform one or more actions, and optionally to capture/record and communicate data associated with an event one or more other devices over a network with little or no user intervention. In embodiments, an instrumented object 131I may comprise an computer device/system embedded in some other device or object, such as robots, smart toys, smart appliances, and/or the like, and may include microcontrollers or microprocessors, memory/storage devices, communication circuitry (e.g., transceiver(s), modem, antenna elements, etc.), sensors/meters, image capture devices, microphones, light emitting devices, audio emitting devices, image/video playback devices, EMCs, and/or other like components that may be the same or similar to those discussed herein.

The instrumented objects 131I may store program code (or have FPDs preconfigured with appropriate logic blocks/fabric or the like) to perform one or more actions mentioned previously. According to various embodiments, the communications circuitry of the instrumented objects 131I may receive one or more messages from the AR platform 105, which may include instructions to perform indicated actions of the one or more actions. The instructions may be based on the user interactions detected by the AR platform 105. This may allow the instrumented objects 131I to interact with the user 108 and/or other objects (e.g., physical, virtual, or instrumented objects) based on the various user interactions in the environment 115. In embodiments where the instrumented objects 131I may capture, store/record, and communicate data associated with an event, the event data captured by instrumented objects 131I may be used to augment or supplement the environment modeling mechanisms that is done using the sensor data from the sensors of the sensor array 120.

The user 108 may be an operator of a AR platform 105 and may interact with the various objects 131 in the environment 115. In some implementations, the user 108 may affix or couple the wearable 110 to his/her body. As shown, the wearable 110 is coupled with a wrist of the user 108; however, the user 108 may affix multiple wearables 110 to his/her body, such as a wearable 110 for each wrist of the user 108, a wearable 110 coupled with a torso of the user 108, or the like. Sensor data captured by the wearable 110 may be used to determine position and/or orientation information and/or body motions of one or more body parts of the user 108. Additionally, although FIG. 1 only shows a single user 108, the embodiments herein may allow multiple user 108 to interact with multiple objects 131 and multiple bindings 135.

Wearable device 110 (or "wearable 110") may be an inertial sensor unit (IMU) or some other suitable device that is embedded with hardware that enable measurement and/or detection of motion, acceleration, rotation, and/or an orientation of the wearable 110. The wearable 110 may include one or more microelectromechanical system (MEMS) or sensors, such as accelerometers, gyroscopes, magnetometers, and/or other like sensors. The one or more MEMS/sensors may be configured to determine a magnitude and direction of a velocity, acceleration, and/or motion of the wearable 110, and convert the velocity, acceleration, and/or motion of the wearable 110 into position and/or orientation information. The changes in the positions and/or orientations of the wearable 110 may be indicative of a biomechanical motion performed by a user 108 of the wearable 110. The one or more MEMS/sensors may be configured to detect the biomechanical motion as sensor data. The sensor data may include or otherwise indicate one or more spatial coordinates (or changes in spatial coordinates) for the positions and/or orientations of the wearable 110. The sensor data may then be passed to one or more processors and/or a sensor hub of the wearable 110 to be converted into a biomechanical sequence, sensor coordinates, and/or any other type of format of analyzed, processed, or formatted data. Furthermore, the wearable 110 may track a timing of the biomechanical motion by timestamping the sensor data as it is collected and/or processed. Wearable 110 may also include, or be coupled with communications circuitry that enables the wearable 110 to communicate with one or more other devices (e.g., AR platform 105 and/or server(s) 145) over a network (e.g., network 150 or local network 155) via a wired or wireless network with little or no user intervention. In this regard, one or more memory devices, and one or more processors. As examples, the wearable 110 may be any type of wearable computer device or wearable technology, such as a smart watch, fitness or activity tracker, a sensor system embedded in equipment or clothing, a telemetry system, and/or the like. In embodiments where the user 108 uses a wearable 110, the sensor data captured by the wearable 110 may be used to augment or supplement the gesture detection mechanisms that use the sensor data from the sensors of the sensor array 120.

Although FIG. 1 shows various devices and/or components, according to various embodiments, any number of computing devices (clients and servers), sensors, output devices, users, and/or of databases (not shown) may be present. Additionally, some or all of the devices components shown by FIG. 1 may be separate and positioned in various arrangements, collocated with one another, reside on one physical hardware device or otherwise fully integrated with one another, implemented as virtual machines, and/or set up in a multitude of implementations, arrangements, and/or environments. Thus, the depiction of the illustrative embodiments of FIG. 1 should be taken as being illustrative in nature, and not limited to the scope of the disclosure.

Figure 2:
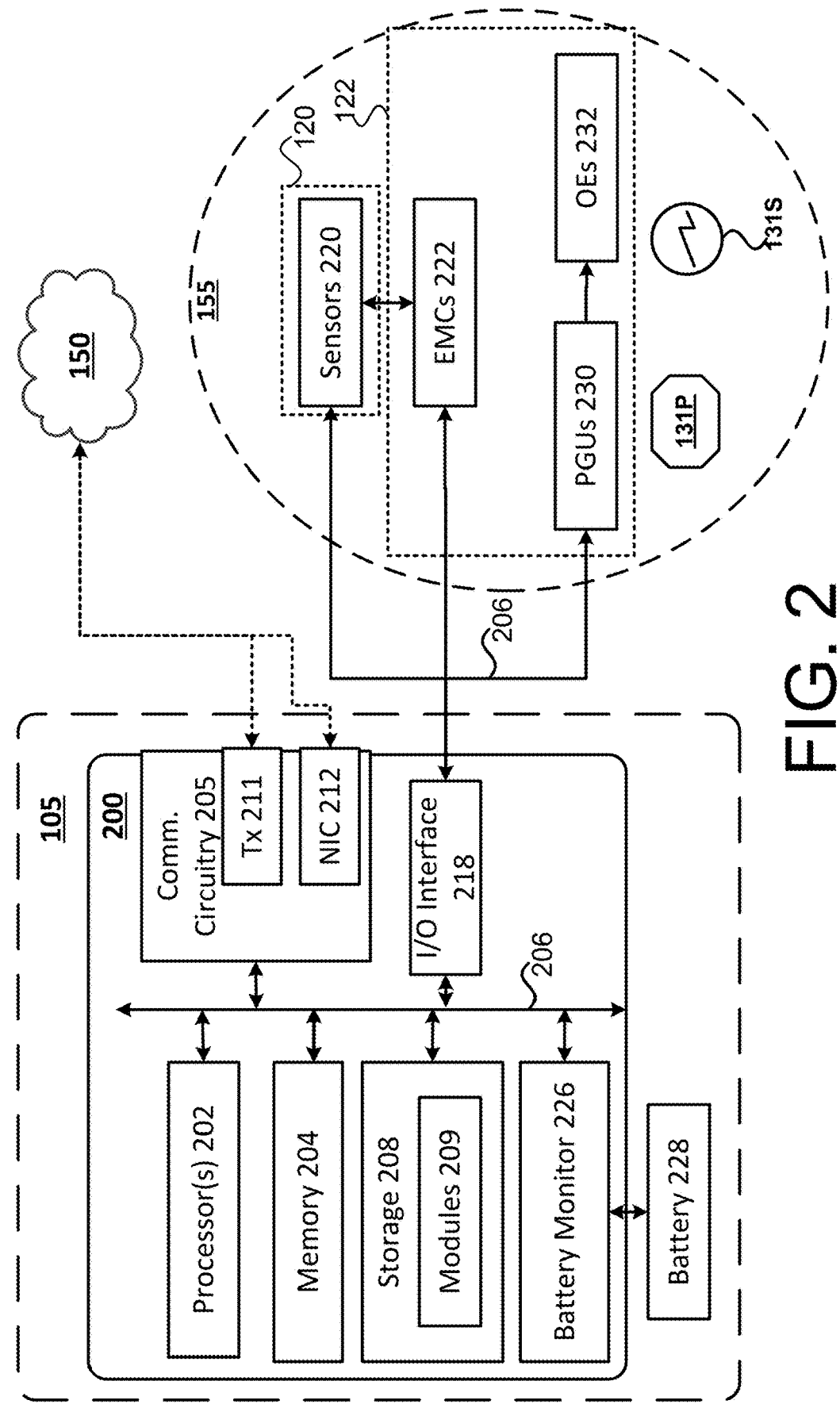
FIG. 2 illustrates an example implementation of a computer device, in accordance with various embodiments.

FIG. 2 illustrates an example implementation of a computer device 200, in accordance with various embodiments. FIG. 2 shows a block diagram of an example of components that may be present in computer device 200. The computer device 200 may include any combinations of the components shown FIG. 2. The components may be implemented as integrated circuits (ICs) or portions thereof, discrete electronic devices, or other modules, logic, hardware, software, firmware, middleware or a combination thereof adapted in the computer device 200, or as components otherwise incorporated within a chassis of a larger system.

The computer device 200 may be an embedded system or any other type of computer device discussed herein. In the example shown by FIG. 2, the computer device 200 may be employed in or as an augmented reality (AR) platform 105 or other like device/system as discussed herein. Although FIG. 2 shows the computer device 200 as implemented in AR platform 105, computer device 200 or a computer device that is similar to computer device 200 may be implemented in other devices discussed herein, such as the instrumented object 131I and the one or more servers 145. In another example, the computer device 200 may be a separate and dedicated and/or special-purpose computer device designed specifically to carry out the AR solutions of the embodiments discussed herein.

Processor(s) 202 (also referred to as "processor circuitry 202") may be one or more processing elements configured to perform basic arithmetical, logical, and input/output operations by carrying out instructions. Processor circuitry 202 may be implemented as a standalone system/device/package or as part of an existing system/device/package of the AR system 110. The processor circuitry 202 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 202 may be a part of a system on a chip (SoC) in which the processor circuitry 202 and other components discussed herein are formed into a single IC or a single package. As examples, the processor circuitry 202 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm snapdragon® processor(s); Samsung Exynos® processor(s); and/or the like.

In embodiments, the processor circuitry 202 may include a sensor hub, which may act as a coprocessor by processing data obtained from the sensors 220. The sensor hub may include circuitry configured to integrate data obtained from each of the sensors 220 by performing arithmetical, logical, and input/output operations. In embodiments, the sensor hub may capable of timestamping obtained sensor data, providing sensor data to the processor circuitry 202 in response to a query for such data, buffering sensor data, continuously streaming sensor data to the processor circuitry 202 including independent streams for each sensor 322, reporting sensor data based upon predefined thresholds or conditions/triggers, and/or other like data processing functions.

Memory 204 (also referred to as "memory circuitry 204" or the like) may be circuitry configured to store data or logic for operating the computer device 200. Memory circuitry 204 may include number of memory devices may be used to provide for a given amount of system memory. As examples, the memory circuitry 204 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 204 may include one or more mass-storage devices, such as a solid state disk drive (SSDD); flash memory cards, such as SD cards, microSD cards, xD picture cards, and the like, and USB flash drives; on-die memory or registers associated with the processor circuitry 202 (for example, in low power implementations); a micro hard disk drive (HDD); three dimensional cross-point (3D XPOINT) memories from Intel® and Micron®, etc.

Where FPDs are used, the processor circuitry 202 and memory circuitry 204 (and/or device storage circuitry 208) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 202 to implement various logic functions. The memory cells may include any combination of various levels of memory/storage including, but not limited to, EPROM, EEPROM, flash memory, SRAM, anti-fuses, etc.

Data storage circuitry 208 (also referred to as "storage circuitry 208" or the like), with shared or respective controllers, may provide for persistent storage of information such as modules 209, operating systems, etc. The storage circuitry 208 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 202; hard disk drives (HDDs); micro HDDs; resistance change memories; phase change memories; holographic memories; or chemical memories; among others. As shown, the storage circuitry 208 is included in the computer device 200; however, in other embodiments, storage circuitry 208 may be implemented as one or more separate devices that are mounted in AR platform 105 separate from the other elements of computer device 200.

In some embodiments, the storage circuitry 208 may include an operating system (OS) (not shown), which may be a general purpose operating system or an operating system specifically written for and tailored to the computer device 200. The OS may include one or more drivers, libraries, and/or application programming interfaces (APIs), which provide program code and/or software components for modules 209 and/or control system configurations to control and/or obtain/process data from one or more sensors 220 and/or EMCs 222.

The modules 209 may be software modules/components used to perform various functions of the computer device 200 and/or to carry out functions of the example embodiments discussed herein. In embodiments where the processor circuitry 202 and memory circuitry 204 includes hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 209 may comprise logic for the corresponding entities discussed with regard to FIG. 3, namely, modeling engine 301, user input analysis engine 311, object recognition module 321, AR engine 331, context engine 341, and content/applications 351. These entities are discussed in more detail with regard to FIG. 3.

The components of computer device 200 and/or AR system 110 may communicate with one another over the bus 206. The bus 206 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, bus 206 may be a controller area network (CAN) bus system, a Time-Trigger Protocol (TTP) system, or a FlexRay system, which may allow various devices (e.g., sensors 220, EMCs 222, etc.) to communicate with one another using messages or frames.

The communications circuitry 305 may include circuitry for communicating with a wireless network or wired network. For example, the communication circuitry 305 may include transceiver (Tx) 211 and network interface controller (NIC) 212. Communications circuitry 305 may include one or more processors (e.g., baseband processors, modems, etc.) that are dedicated to a particular wireless communication protocol.

NIC 212 may be included to provide a wired communication link to the network 150 and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 212 may be included to allow connect to a second network (not shown) or other devices, for example, a first NIC 212 providing communications to the network 150 over Ethernet, and a second NIC 212 providing communications to other devices over another type of network, such as a personal area network (PAN) including a personal computer (PC) device. In some embodiments, the various components of the environment 115, such as sensors 220, EMCs 222, PGUs 230, etc. may be connected to the system 110 via the NIC 212 as discussed above rather than via the I/O circuitry 218 as discussed infra.

The Tx 211 may include one or more radios to wirelessly communicate with the network 150 and/or other devices. The Tx 211 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 200. In some embodiments, the various components of the environment 115, such as sensors 220, EMCs 222, PGUs 230, etc. may be connected to the system 110 via the Tx 211 as discussed above rather than via the I/O circuitry 218 as discussed infra. In one example, one or more sensors 220 may be coupled with system 110 via a short range communication protocol, such as BLE or the like. In another example, the PGUs may be coupled with the system 110 via a wireless connection (e.g., via Tx 211 or the like) and operate in conjunction with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols.

The Tx 211 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 711, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 218 may include circuitry, such as an external expansion bus (e.g., Universal Serial Bus (USB), FireWire, Thunderbolt, PCI/PCIe/PCIx, etc.), used to connect computer device 200 with external components/devices, such as sensors 220, EMCs 222, PGUs 230, etc. I/O interface circuitry 218 may include any suitable interface controllers and connectors to interconnect one or more of the processor circuitry 202, memory circuitry 204, data storage circuitry 208, communication circuitry 305, and the other components of computer device 200. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 206), ports, slots, jumpers, interconnect modules, receptacles, modular connectors, etc. The I/O circuitry 218 may couple the system 110 with sensors 220, EMCs 320, PGUs, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like. Although FIG. 2 shows that the sensors 220, EMCs 222, and PGUs 230 are coupled with the computer device 200 via interface circuitry 218, in other embodiments, the sensors 220, EMCs 222, and PGUs 230 may be communicatively coupled with the computer device 200 via Tx 211, using short-range radio links, WiFi signaling, or the like.

Sensors 220 may be any device configured to detect events or environmental changes, convert the detected events into electrical signals and/or digital data, and transmit/send the signals/data to the computer device 200 and/or one or more EMCs 222. Some of the sensors 220 may be sensors used for providing computer-generated sensory inputs in environment 115. Some of the sensors 220 may be sensors used for motion and/or object detection. Examples of such sensors 220 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the sensors 220 may include a lens-less image capture mechanism comprising an array of aperture elements, wherein light passing through the array of aperture elements define the pixels of an image. In embodiments, the motion detection sensors 220 may be coupled with or associated with light generating devices, for example, one or more infrared projectors to project a grid of infrared light onto a scene or environment 115, where an infrared camera may record reflected infrared light to compute depth information.

Some of the sensors 220 may be used for position and/or orientation detection, ambient/environmental condition detection, and the like. Examples of such sensors 220 may include, inter alia, microelectromechanical systems (MEMS) with piezoelectric, piezoresistive and/or capacitive components, which may be used to determine environmental conditions or location information related to the computer device 200. In embodiments, the MEMS may include 3-axis accelerometers, 3-axis gyroscopes, and/or magnetometers. In some embodiments, the sensors 220 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

The EMCs 222 may be devices that allow computer device 200 to change a state, position, orientation, move, and/or control a mechanism or system. The EMCs 222 may include one or more switches; haptic output devices, such as actuators and/or motors (e.g., eccentric rotating mass (ERM) actuators, linear resonant actuator (LRA), piezoelectric actuators, servomechanisms, rotary motors, linear motors, and step motors, etc.), thrusters, projectile ejecting devices (e.g., using spring loaded or compressed air/fluid), and/or the like. In embodiments, the EMCs 222 may comprise speakers, a digital rendering module(s) (e.g., a physical object with a digital rendering module therein), and/or another way to control an acoustic energy emission, an electromagnetic radiation emission, an electric energy application, a magnetic field, and an acceleration or deceleration emitted or experienced by a physical object 130P, including by an instrumented object 131I. In embodiments, computer device 200 may be configured to operate one or more EMCs 222 by transmitting/sending instructions or control signals to the EMCs 222 based on detected user interactions or other like events.

Picture generation units (PGUs) 230 and optical elements (OEs) 232. The PGUs 230 may generate light (e.g., based on digital images), which may be directed and/or redirected to an OE 232 (e.g., a display surface). The digital images may be any type of content stored by the storage circuitry 208, streamed from remote devices via the communication circuitry 205, and/or based on outputs from various sensors 220, EMCs 222, and/or instrumented objects 131I. The generated light may be combined or overlapped with external (e.g., natural) light that is also redirected to the same OE 232. The OE 232 that combines the generated light with the external light may be referred to as a "combiner element" or "combiner."

The PGUs 230 may be one or more electronic devices that create/generate digital images to be directed to OEs 232. The PGUs 230 may be or comprise a projector that may project still or moving images onto the surface(s) of OEs 232 via one or more reflection surfaces (e.g., mirrors) based on a received signal. The projector of each PGU 330 may be an LED projector, a laser diode projector, a LCD projector, a digital light processing (DLP) projector, a liquid crystal on silicon (LCoS) projector, and/or any other like projection device. The projector may comprise a light source and various electronic devices (or electronic system) that may generate the images for display, such as one or more processors/GPUs, one or more memory devices, and other like components. This may be done by converting the image into a signal for controlling the light source to generate/output light of different colors and intensities. The projector may also comprise a combiner (also referred to as "combiner optic" and the like), which may combine different light paths into one light path to define a palette of colors. In some embodiments, the projector may comprise scanning mirrors that copy the image pixel-by-pixel and then project the image for display. In some embodiments, the PGUs 230 may comprise a relay lens assembly and a combiner element (which may be different than the combiner of the projector). The relay lens assembly may comprise one or more relay lenses, which re-image images from the projector into an intermediate image that then reaches an OE 232 (e.g., the combiner element) through a reflector.

The combiner element (as well as other OEs 232) may be a display surface, which may be fully or partially opaque or transparent, that mixes the digital images output by the projector/PGUs 230 with viewed real-world objects to facilitate augmented reality. One or more of the OEs 232 may be transmissive optical elements, where the transmitted beam (reference beam) hits the OE 232 and the diffracted beam(s) go through the OE 232. One or more OEs 232 may be reflective optical elements, where the transmitted beam (reference beam) hits the OE 232 and the diffracted beam(s) reflects off of the OE 232 (e.g., the reference beam and diffracted beams are on the same side of the OE 232). In embodiments, the OEs 232 may be a holographic OE, and in some embodiments, the combiner element may be a hologram or holographic image (e.g., ether a transmissive HOE or reflective HOE).

Where HOEs 232 are used, one or more of the HOEs 232 may use waveguide holographic techniques to progressively extract a collimated image guided by total internal reflection (TIR) in a waveguide pipe. The waveguide pipe may be a thin sheet of glass or plastic through which the generated light bounces to route the generated light to the viewer/user. In some embodiments, the HOEs 232 may utilize holographic diffraction grating (e.g., Bragg diffraction grating) to provide the generated light to the waveguide at a critical angle, which travels through the waveguide. The light is steered toward the user/viewer by one or more other HOEs 232 that utilize holographic diffraction grating. These HOEs 232 may comprise grooved reflection gratings and/or a plurality of layers of alternating refraction indexes (e.g., comprising liquid crystals, photoresist substrate, etc.); the grooved reflection gratings and/or the refractive index layers may provide constructive and destructive interference and wavelet dispersion.

The battery 228 may power the computer device 200. In embodiments, the battery 328 may be a lithium ion battery, a metal-air battery, such as a zinc-air battery, an aluminum-air battery, a lithium-air battery, a lithium polymer battery, and the like. The battery monitor 226 may be included in the computer device 200 to track/monitor various parameters of the battery 228, such as a state of charge (SoCh) of the battery 228, state of health (SoH), and the state of function (SoF) of the battery 228. The battery monitor 226 may include a battery monitoring IC, which may communicate battery information to the processor circuitry 202 over the bus 206.

Bus 206 may allow components of computer device 200 and/or AR system 110 to communicate with one another. The bus 206 may include any number of technologies, such as a Local Interconnect Network (LIN); industry standard architecture (ISA); extended ISA (EISA); Peripheral Component Interconnect Express (PCI); PCI extended (PCIx); PCI express (PCIe); an Inter-Integrated Circuit (I2C) bus; a Parallel Small Computer System Interface (SPI) bus; point to point interfaces; a power bus; a proprietary bus, for example, used in a SoC based interface; or any number of other technologies. Suitable implementations and general functionality of such bus systems are known, and are readily implemented by persons having ordinary skill in the art.

While not shown, various other devices may be present within, or connected to, the computer device 200. For example, I/O devices, such as a display, a touchscreen, or keypad may be connected to the computer device 200 via bus 206 to accept input and display outputs. In another example, the computer device 200 may include or be coupled with positioning circuitry configured to determine coordinates based on signals received from global navigation satellite system (GNSS) constellations. In another example, the communications circuitry 305 may include a Universal Integrated Circuit Card (UICC), embedded UICC (eUICC), and/or other elements/components that may be used to communicate over one or more wireless networks.

Figure 3:
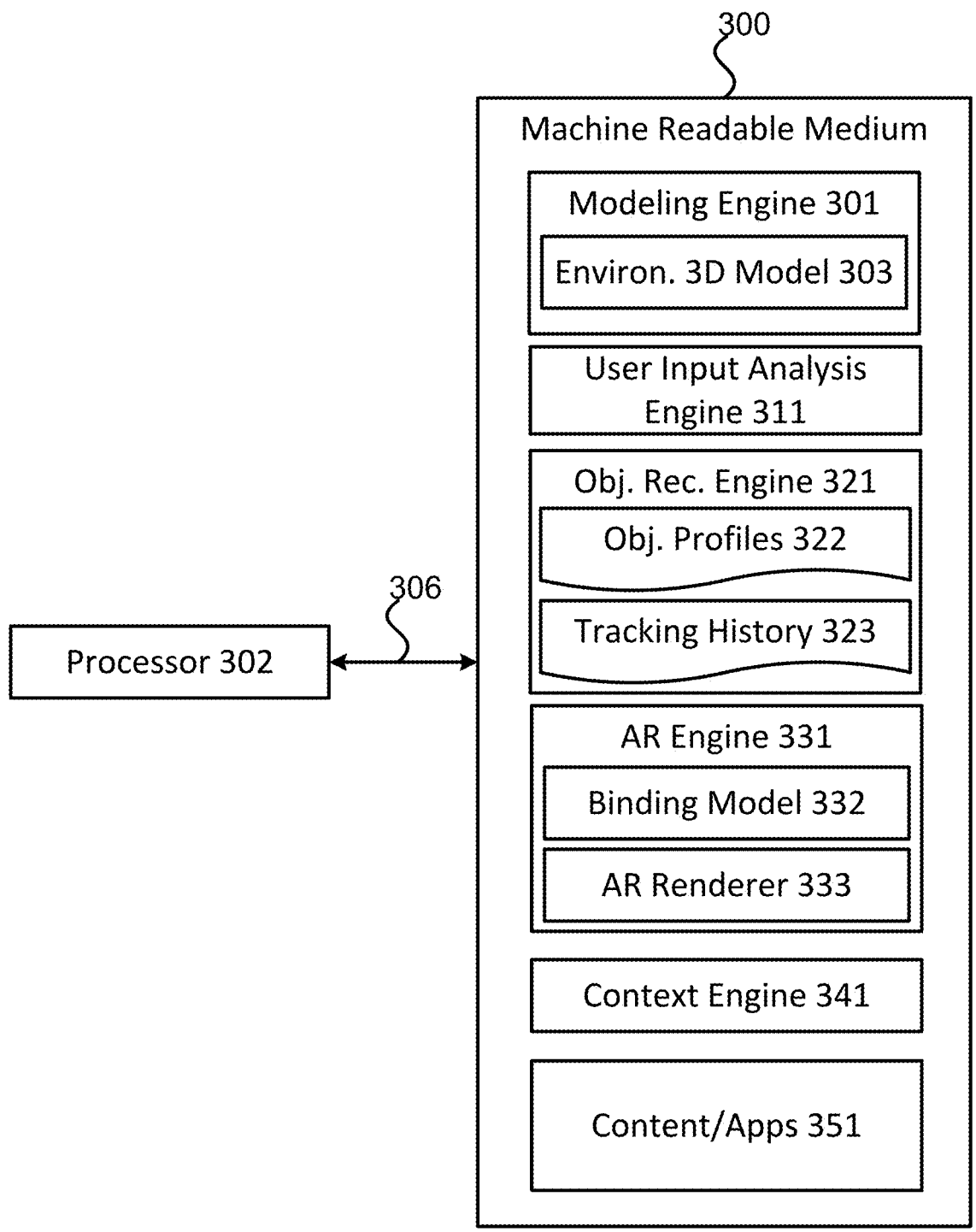
FIG. 3 illustrates an example of non-transitory computer-readable storage media that may be suitable for use to store instructions that cause an apparatus, in response to execution of the instructions by the apparatus, to practice selected aspects of the present disclosure

FIG. 3 is a block diagram of a non-transitory, machine readable medium (NTMRM) 300 including code to direct a processor 302 to perform various functions delineated by the embodiments discussed herein. In embodiments, the non-transitory, machine readable medium 300 may be implemented in an AR platform 105 and/or server(s) 145. The processor 302 may access the non-transitory, machine readable medium 300 over a bus 306. The processor 302 and bus 306 may be the same or similar as described with respect to the processor 202 and bus 206 of FIG. 2, respectively. The non-transitory, machine readable medium 300 may include devices described for the mass storage 208 of FIG. 2 or may include optical disks, thumb drives, or any number of other hardware devices. In alternate embodiments, machine readable medium 300 may be transitory, e.g., signals. The NTMRM 300 may include code of a modeling engine 301 to direct the processor 302 to obtain first sensor data from sensors 220 of the sensor array 120. The first sensor data may be representative of a physical environment (e.g., environment 115) and/or physical objects 131P in the environment 115. In some embodiments, the modeling engine 301 may direct the processor 302 to track physical objects 131P in the environment 115 based on information of the first sensor data. In some embodiments, the modeling engine 301 may direct the processor 302 to generate a three-dimensional (3D) model 303 of the physical environment 115 for an AR environment based on the first sensor data. The 3D model 303 may be a suitable collection of data points in 3D space connected by various geometric shapes or entities and may include textual information for various surfaces of the environment 115. The 3D model 303 may be generated using any suitable modeling techniques/technologies. In some embodiments, modeling engine 301 may compare the 3D model 303 with other sensor data (e.g., image or video data) captured by the sensors 220.

The NTMRM 300 may include code of a user input analysis engine 311 to direct the processor 302 to obtain, from sensors 220 of the sensor array 120, second sensor data that is representative of one or more user interactions. The user interactions may include gestures performed by the user 108 and/or voice commands issued by the user 108. In some embodiments, the second sensor data may include sensor data obtained from the wearable 110 worn by the user 108, which may be used to augment or supplement the second sensor data.

With regard to gesture recognition, in one example, the user input analysis engine 311 may detect gestures using key pointers in a 3D/skeletal-based model or an appearance-based model, including feature detection of body parts, and may determine actions utilizing a gesture library that correlates a specific gesture to one or more particular actions. In embodiments where the environment 115 includes a capacitive, resistive, or other like touch-surface, the user input analysis engine 311 may obtain a touch signal from circuitry of the touch-surface. The touch signal may include information regarding a location of the touch (e.g., one or more sets of (x,y) coordinates describing an area, shape or skeleton of the touch), a pressure of the touch (e.g., as measured by area of contact between a user's finger or a deformable stylus and the touchscreen 104, or by a pressure sensor), a duration of contact, any other suitable information, or any combination of such information. In this embodiment, the user input analysis engine 311 may identify gesture(s) based on the information of the touch signal, and utilizing the gesture library discussed previously.

With regard to voice recognition, the user input analysis engine 311 may perform speech recognition using acoustic modeling, language modeling approaches, hidden Markov modeling, dynamic time wrapping, neural networks, and/or the like; and may use natural language processing (NLP) algorithm(s) to identify a particular voice command from the recognized speed. The detected voice commands may be translated into one or more actions using a voice command library, which may be the same or similar to the gesture library discussed previously. The actions may include generating and providing various projection/display, haptic, sound, and/or chemical outputs. The actions may also include generating and sending messages to instrumented objects 131I to instruct the instrumented objects 131I to perform various actions.

The NTMRM 300 may include code of an object recognition engine 321 to direct the processor 302 to identify a physical object within the 3D model 303. For example, the object recognition engine 321 may include a feature detector, a hypothesizer, a hypothesis verifier, and a model database that includes object models. The feature detector may apply operators to the 3D model 303 and may identify locations of various features for forming object hypotheses. A feature may be an attribute of an object, such as size, color, shape, relation to other objects, etc. The features used by the object recognition engine 321 may depend on the objects indicated by the object profiles 322 and/or the tracking history 323, and the organization of the model database. Using the detected features, the hypothesizer may assign a likelihood/probability to each potential object in the 3D model 303 to produce candidate objects. The verifier may use object models from the model database to verify the hypotheses and refine the likelihood/probability assigned to the objects. The object models in the model database may be qualitative or functional description, geometric surface information, and/or abstract feature vectors. The model database may be organized using some type of indexing scheme to facilitate elimination of unlikely object candidates from possible consideration. The object recognition engine 321 may, for each candidate object, select an object from an object model with a highest likelihood/probability as the detected object.

As shown, the object recognition engine 321 may include object profiles 322 and tracking history 323. Object profiles 322 may indicate various attributes for a detected object 131 (including physical objects 131P, virtual objects 131V, instrumented objects 131I, and/or other bindings 135), such as a size, shape, color, etc. to be used for the object recognition, and may include or indicate various binding or gameplay-related attributes that may influence the creation and/or manipulation of various bindings 135. The binding or gameplay-related attributes may indicate various physical properties that a binding 135 should have/exhibit/emulate, for example, size, shape, color(s), elasticity, stiffness, fluidity, etc. In role-player games (RPGs) or fighting or duel-based games, the binding or gameplay-related attributes may indicate hit points, lifespan, or other like attributes. Additionally, the object profiles 322 may also include relationship-based attributes, which may be attributes applied to a binding 135 based on an associated object 131. For example, a binding 135 may include one or more virtual binding to physical object (VB-PO) attributes when a user 108 associates a binding 135 with one or more physical objects 131P, one or more virtual binding to VO (VB-VO) attributes when the user 108 associates a binding 135 with one or more virtual objects 131V, and one or more virtual binding to instrumented object 131I (VB-IO) attributes when the user 108 associates a binding 135 with one or more instrumented objects 131I. The VB-PO, VB-VO, and/or VB-IO attributes may be based on the attributes of the corresponding physical object 131P, virtual object 131V, and/or instrumented object 131I as indicated by the object profiles 322. Furthermore, the object profiles 322 of instrumented objects 131I may include information for instructing an instrumented object 131I to perform various actions, such as the instructions to perform individual actions, supported message formats, supported signaling protocols, and/or the like. The tracking history 323 may indicate previously detected objects and/or attributes of the previously detected objects, and may influence the attributes associated with the bindings 135. The object profiles 322 and tracking history 323 may be formed using any suitable format, such as XML, JSON, Abstract Syntax Notation One (ASN.1), ARML, or some other suitable data structure.

The NTMRM 300 may include code of an AR engine 331 to direct the processor 302 to generate an instance of a virtual binding 135 based on one or more identified/detected objects 131 (e.g., as determined by the object recognition engine 321) and the identified/detected user interactions (e.g., as determined by the user input analysis engine 311). The instance of the virtual binding 135 may have one or more attributes that influence one or more actions that may be performed by the virtual binding 135 or using the binding 135, which may be based on the attributes of an object profile 322 of the detected objects 131. The AR engine 331 may include binding models 331, which may describe or define a process for generating an instance of the binding 135 based on the one or more attributes of the object profile 322. The AR renderer 333 may operate in conjunction with the AR engine 331 to display/project the generated images according to one or more known video mapping or projection mapping methods, one or more known projection methods, and/or any other like known method for displaying/projecting images. The hardware devices used by the AR engine 331 and the AR renderer 333 may include one or more GPUs and/or any other like hardware device that is configured to perform complex image generation and/or rendering calculations.

The AR engine 331 may provide the generated instance of the binding 135 to interface circuitry, which may provide the instance of the virtual binding 135 to be displayed/rendered/projected such that, upon display of the instance, the virtual binding 135 may appear to be attached to the object 131 or appear to interact with the object 131. Additionally, the AR engine 331 may provide the instructions/commands to interface circuitry and/or communication circuitry, which may provide the instructions/commands to instrumented objects 131I to perform various actions.

In a first example, when a detected user interaction is a user interaction to indicate a selection of a particular virtual binding 135, the AR engine 331 may obtain one or more object attributes from an object profile 322 of the detected object 131, and generate a selection instance of the virtual binding 135 to emulate various physical properties indicated by the one or more obtained attributes.

In a second example, when the detected user interaction is a user interaction to associate the virtual binding 135 with the detected object 131, the AR engine 331 may generate an association instance of the virtual binding 135 such that the virtual binding 135 appears to be attached to, or otherwise interact with the detected object 131 upon display. Depending upon an object type of the detected object 131, the AR engine 331 may identify one or more VB-PO/VO/IO attributes of the association of the virtual binding 135 with the physical object 131P, and the VB-PO/VO/IO attributes may indicate how the virtual binding 135 is to interact and/or be manipulated.

In embodiments, the AR engine 331 may also generate instances of virtual objects 131V based on the detected objects 131, detected user interactions, and/or various bindings 135. The virtual objects 131V may include object attributes indicated by corresponding object profiles 322. The AR engine 331 may provide the generated instance of the virtual objects 131V to the interface circuitry, which may provide the instance of the virtual objects 131V to be displayed/rendered/projected.

The NTMRM 300 may include code of a context engine 341 to direct the processor 302 to determine one or more contextual attributes, which may be used to influence how the binding 135 is to be created and/or manipulated. The context engine 341 may determine aspects such as user activity, user attributes, semantic location, social circumstances, ambient/environmental conditions, presence of electronic devices, schedules, communication, etc. that may allow the AR platform 105 to determine what desirable actions may be in a given circumstance. The user activity contexts may include any information related to user 108, such as body (or body part) positions/orientations. The user attributes may include any information related to user 108, such as user's preferences for various games or objects 131, and/or any other like preferences indicating a user's tastes, interests, goals, and the like. The user preferences may be set by the user 108, or obtained from one or more applications 351 running on the computing devices 110. The user preferences may be obtained explicitly (e.g., by obtaining user ratings and/or rankings) or implicitly (e.g., by mining click-through data, log data, user profile data, and the like of the content/apps 351). The user attributes may also include other information such as an internet service or cellular service subscription type or data plan, a subscription to one or more content providing services, user preferences, demographic information, etc. The environmental-based contextual information may include information, such as a distance between the user 108 and various objects 131 in the environment 115, ambient lighting, background noise, surrounding electromagnetic fields, and/or any other like biotic or abiotic factors surrounding the user 108 and/or environment 115. The contexts may also include device attributes, such as information indicative of one or more peripheral devices (e.g., sensors 220, EMCs 222, and the like) and/or internal components (e.g., processor types, memory devices, etc.) of the AR platform 105 and/or components of the environment 115.

Although FIG. 3 shows program code of various modules or engines stored by the NTMRM 300, in some implementations, a combination of the program code with the hardware elements (or a combination of circuits used in an electrical or electronic system) used to carry out the functionality of that program code (e.g., processor 302, NTMRM 300, bus 306, and the like) may be referred to as a particular type of circuitry. For example, a combination of various hardware elements and the modeling engine 301 may be referred to as "modeling circuitry", a combination of various hardware elements and the user input analysis engine 311 may be referred to as "user input circuitry", a combination of various hardware elements and the object recognition engine 321 may be referred to as "object recognition circuitry", a combination of various hardware elements and the AR engine 331 may be referred to as "AR circuitry", and a combination of various hardware elements and the context engine 341 may be referred to as "context circuitry". Other combinations may be possible in other embodiments.

Figure 4:
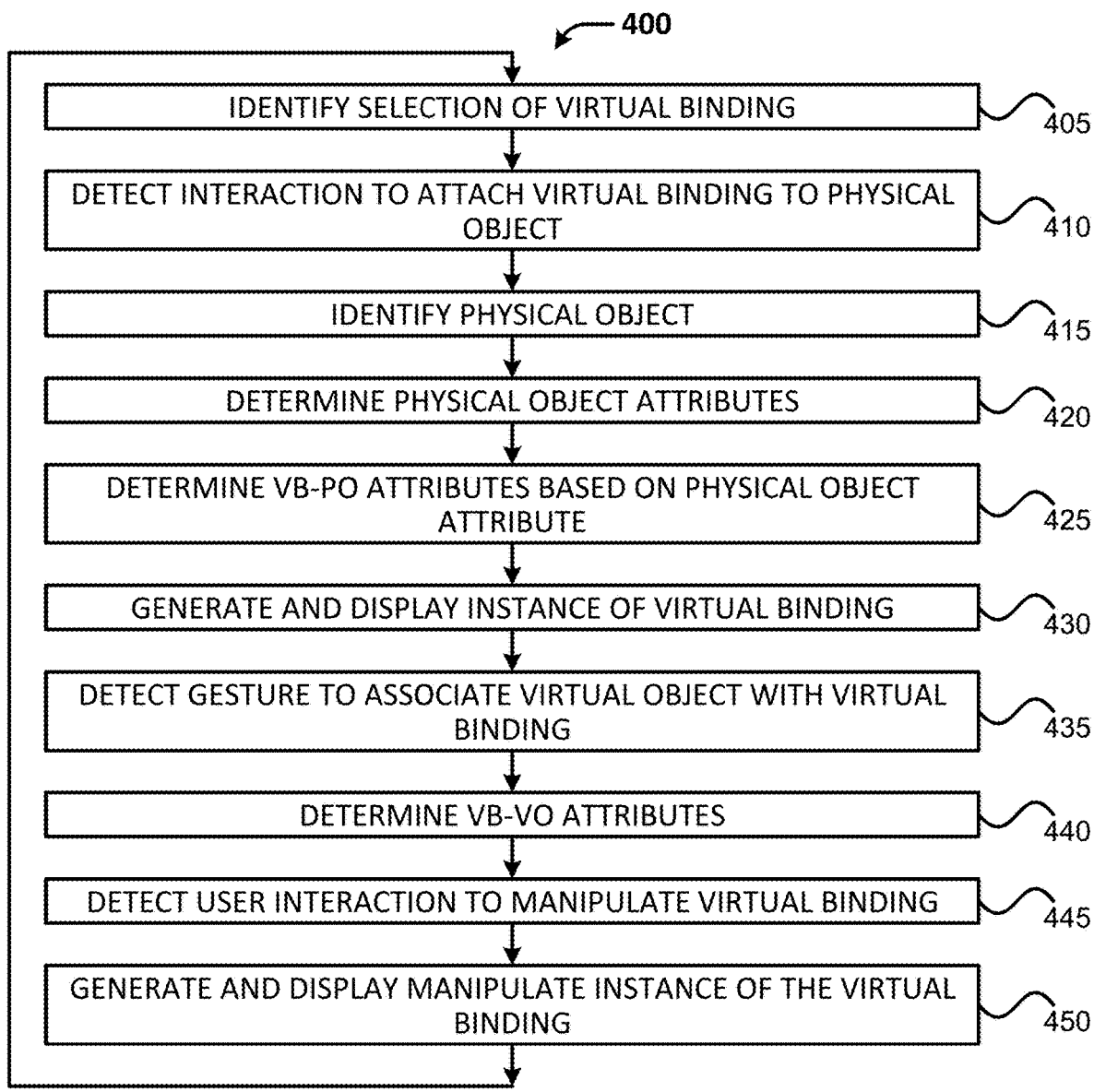
FIG. 4 illustrates an example process in accordance with various embodiments.
Figure 5:
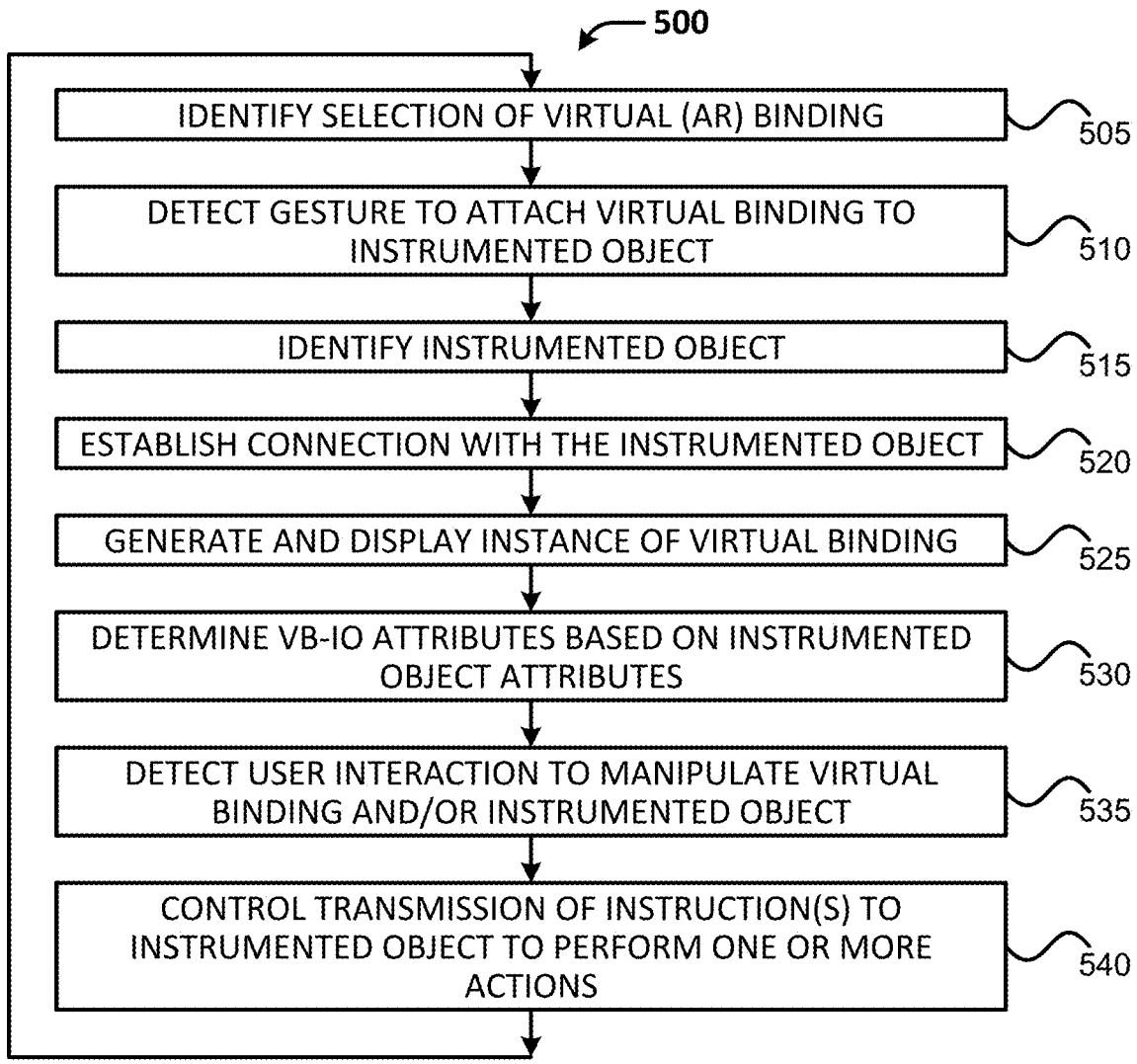
FIG. 5 illustrates another example process in accordance with various embodiments.

FIGS. 4-5 illustrates processes 400-500 for generating and displaying bindings 135 in accordance with various embodiments. For illustrative purposes, the operations of the aforementioned processes are described as being performed by the various elements discussed with regard to FIGS. 1-3. However, it should be noted that other computing devices (or components thereof) may operate the processes 400-500 in a multitude of implementations, arrangements, and/or environments. In embodiments, the processes 400-500 may be implemented as program code, which when executed by a processor, causes a computer system to perform the various operations of the processes. While particular examples and orders of operations are illustrated in FIGS. 4-5, in various embodiments, these operations may be re-ordered, separated into additional operations, combined, or omitted altogether.

Referring to FIG. 4, process 400 may begin after the AR platform 105 is turned on or otherwise activated, or when the user 108 controls the AR platform 105 to being operation. At operation 405, a user input analysis engine 311 of the AR platform 105 may identify a selection of a virtual binding 135, which may be based on sensor data that is representative of one or more user interactions (e.g., gestures, voice commands, etc.). At operation 410, the user input analysis engine 311 may detect a user interaction to attach the virtual binding 135 to a physical object 131P. The AR platform 105 may control the sensors 220 of the sensor array 120 to scan the environment 115, and may generate sensor data that is representative of the scanned environment 115. The AR system 115 may obtain this sensor data, and generate a 3D model 303 of the environment 115, including any physical or instrumented objects 131 that are in the environment 115. After the 3D model 303 is created, the AR platform 105 may control the sensors 220 of the sensor array 120 to detect user interactions, including gestures and/or voice commands.

At operation 415, the object recognition engine 321 of the AR platform 105 may identify the physical object 131P, and at operation 420, the AR engine 331 of the AR platform 105 may determine one or more physical attributes of the physical object 131P using an object profile 322 of the identified physical object 131P. At operation 420, the AR engine 331 of the AR platform 105 may determine virtual binding 135 to physical object 131P (VB-PO) attributes based on the physical object 131P attributes and/or using the object profile 322. At operation 430, AR engine 331 of the AR platform 105 may generate an instance of the virtual binding 135, and may control the interface circuitry of the AR platform 105 to provide the instance of the virtual binding 135 for display.

At operation 435, the user input analysis engine 311 of the AR platform 105 may detect another user interaction to associate a virtual object 131V with the virtual binding 135. At operation 440, the AR engine 331 of the AR platform 105 may determine virtual binding 135 to virtual object 131V (VB-VO) attributes, which may be based on attributes of the virtual object 131V and/or an object profile 322 of the virtual object 131V. At operation 445, the user input analysis engine 311 of the AR platform 105 may detect a user interaction to manipulate the virtual binding 135. At operation 445, AR engine 331 of the AR platform 105 may generate a manipulate instance of the virtual binding 135, and may control the interface circuitry of the AR platform 105 to provide the manipulate instance of the virtual binding 135 to be display. After performing operation 450, process 400 may repeat as necessary or end.

Referring to FIG. 5, process 500 may begin after the AR platform 105 is turned on or otherwise activated, or when the user 108 controls the AR platform 105 to being operation. At operation 505, a user input analysis engine 311 of the AR platform 105 may identify a selection of a virtual binding 135, which may be based on sensor data that is representative of one or more user interactions (e.g., gestures, voice commands, etc.). At operation 510, the user input analysis engine 311 may detect a user interaction to attach the virtual binding 135 to an instrumented object 131V. Operations 505 and 510 may be the same or similar to operations 405 and 410 of process 400.

At operation 515, the object recognition engine 321 of the AR platform 105 may identify the instrumented object 131I. At operation 520, the AR engine 331 of the AR platform 105 may control the communication circuitry 205 to establish a connection with the instrumented object 131I. At operation 525, the AR engine 331 of the AR platform 105 may generate an instance of the virtual binding 135, and may control interface circuitry of the AR platform 105 to provide the instance of the virtual binding 135 to be display.

At operation 530, the AR engine 331 of the AR platform 105 may determine attributes of the instrumented object 131I and/or VB-IO attributes based on the instrumented object 131I attributes. These attributes may be identified from an object profile 322 associated with the instrumented object 131I, which is stored by the object recognition engine 321. These attributes may also include instructions and/or other like information for instructing the instrumented object 131I to perform one or more actions.

At operation 535, the user input analysis engine 311 may detect a user interaction to manipulate the virtual binding 135 and/or the instrumented object 131I, and at operation 540, the AR engine 331 of the AR platform 105 may control the communication circuitry 205 to transmit selected instructions to the instrumented object 131I to perform one or more actions based on the user interaction detected at operation 535. After performance of operation 540, process 500 may repeat as necessary or end.

Figure 6:
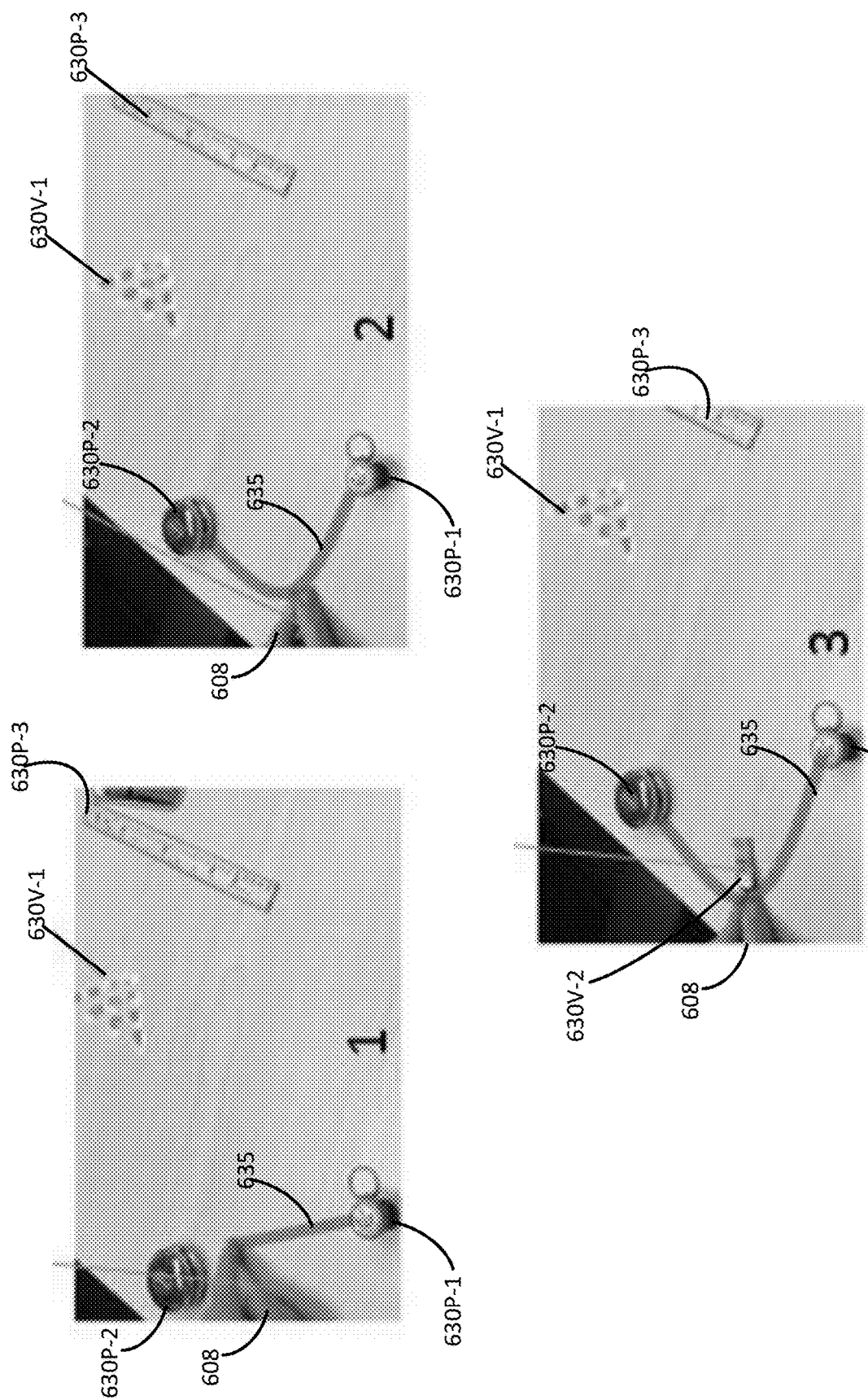
FIGS. 6-7 illustrate an example of user interactions with physical objects in accordance with various embodiments.
Figure 7:
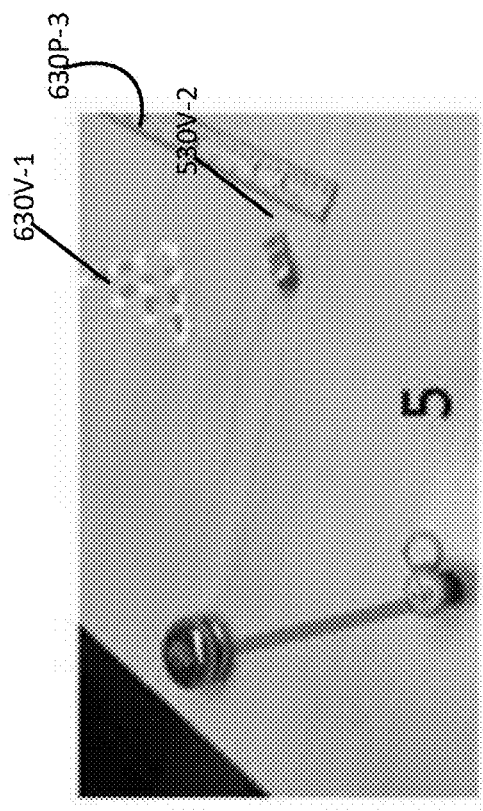
Figure 7:
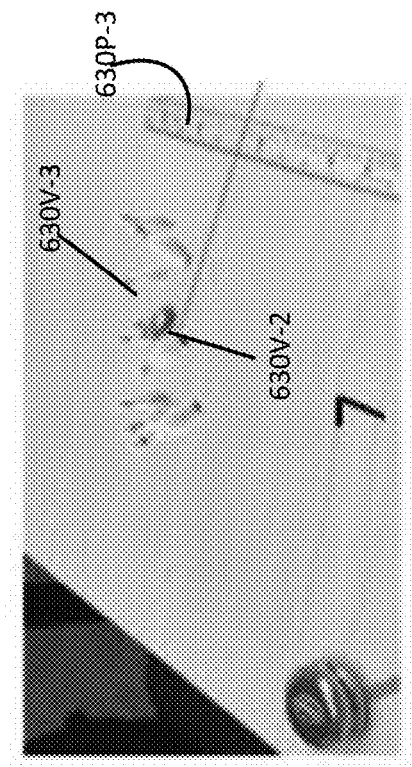
Figure 7:
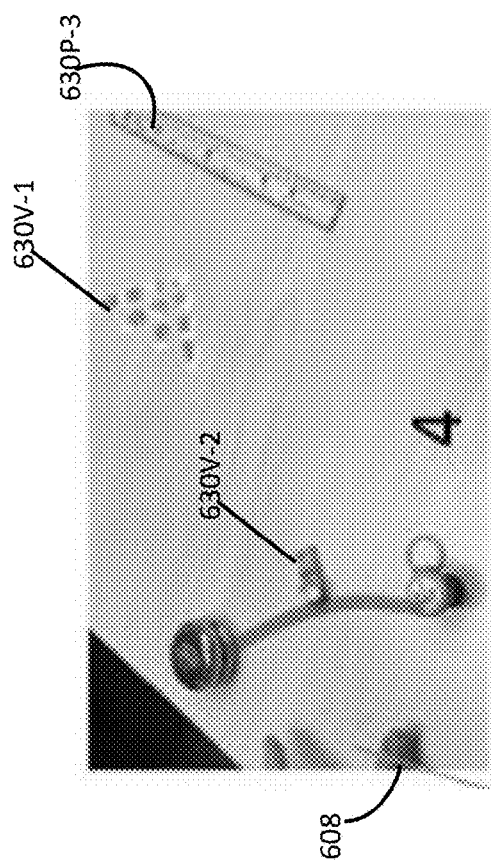
Figure 7:
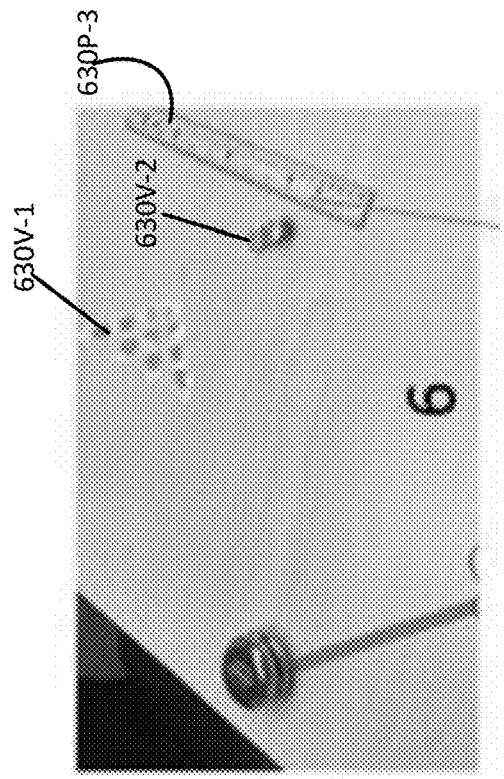

FIGS. 6-7 illustrate various user interaction stages in accordance with various embodiments. The example shown by FIGS. 6-7 may be a slingshot-bowling game, where a user attempts to knock down a set of pins (e.g., virtual object 630V-1) using a projectile (virtual object 630V-2) using a virtual binding (e.g., binding 635).

Referring to FIG. 6, at stage 1 the user 608 (represented by the hand in FIG. 6) may cause a binding 635 to be generated by the AR platform 105 to bind two physical objects 630P-1 and 630P-2 by performing a tap-hold gesture using an index finger at a first physical object 630P-1, and dragging the tip of the index finger from the first physical object 630P-1 towards a second physical object 630P-2. Once the index finger of the user 608 reaches the second physical object 630P-2, the AR platform 105 may connect an end of the binding 635 to the second physical object 630P-2, and the user 608 may release the hold gesture. In this example, the physical objects 630P-1 and 630P-2 may represent the tips of a Y-frame typically used in classic slingshots. Stage 1 also shows a third physical object 630P-3 (e.g., a ruler) and a projected virtual object 630V-1 (e.g., a pin formation in FIG. 5). In this example, the game may require the user 608 to shoot a projectile to knock down pins of object 630V-1 by ricocheting off of the object 630P-3.

At stage 2, the user 608 may perform a grab and hold gesture on the binding and then perform a pulling gesture to stretch the binding 635 towards the user 608. As the user 608 stretches the binding 635, multiple instances of the binding 635 may be generated by the AR platform 105, and displayed in such a way that the binding 635 appears to exhibit various physical properties. For example, typical slingshots operate using stored elastic energy to shoot a projectile at high speed, where the elastic energy is created and stored as a slingshot operator draws back rubber bands that are connected to a Y-frame of the slingshot. In this example, the AR platform 105 may emulate elastic energy to be stored in the binding 635 as the user 608 performs the grab and pull gestures, such as by using linear or non-linear elasticity equations.

At stage 3, a virtual object 630V-2 may be generated by the AR platform 105, and displayed. In this example, the virtual object 630V-2 may be a projectile to be shot at the virtual object 630V-1 via physical object 630P-3. In embodiments, the gestures performed with or around the binding 635 may indicate a desired virtual object to be generated. In this example, the act of pulling the binding 635 towards the user 608 at stage 2 may indicate that the user 608 wishes to create a slingshot pocket. In response to detecting the grab and/or pulling gestures at stage 2, the AR platform 105 may generate and display the projectile object 630V-2 in a slingshot pocket created by the bent binding 635 at stage 3.

Referring to FIG. 7, at stage 4 the user 608 may perform a gesture to release the binding 635, and in response, the AR platform 105 may generate and display various images or an animation showing the binding 635 and virtual object 630V-2 reacting to the gesture, which is shown by stages 4, 5, and 6. In this example, upon performing the release gesture, various instances of the binding 635 may be generated and displayed showing the elastic energy stored by the binding 635 being released and translated into kinetic energy of the projectile object 630V-2. At stage 6, the AR platform 105 may generate and display various images or an animation showing the virtual object 630V-2 ricocheting off of the physical object 630P-3. At stage 7, the AR platform 105 may generate and display various images or an animation showing the virtual object 630V-2 and the virtual object 630V-1 interacting with one another. In this example, the AR platform 105 may generate and display various images or an animation of set of pins 630V-3 being knocked down by the projectile object 630V-2 after it ricocheted off physical object 630P-3.

Figure 8:
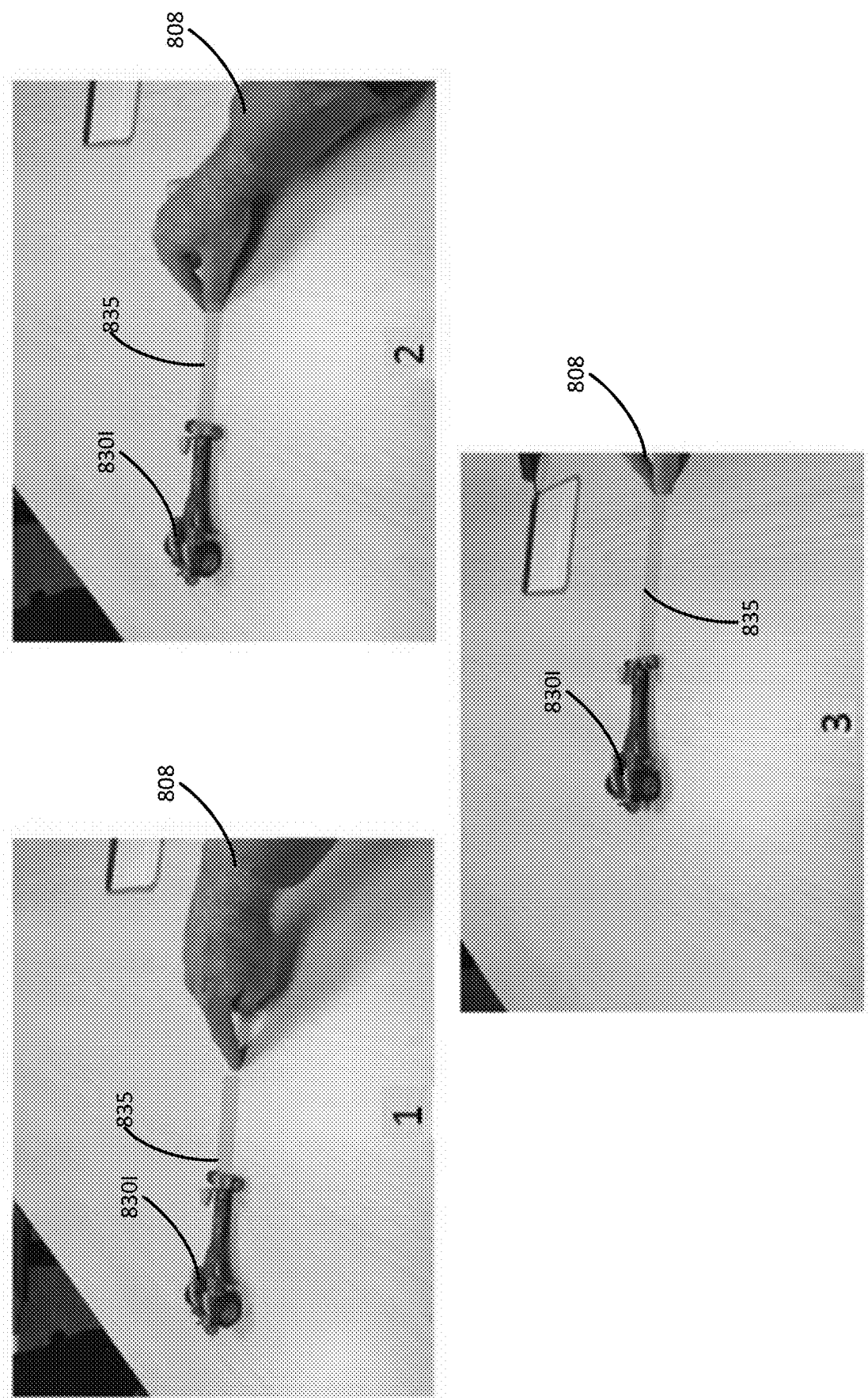
FIG. 8 illustrates an example of user interactions with instrumented objects in accordance with various embodiments.

FIG. 8 illustrates various user interaction stages in accordance with various embodiments. The example shown by FIG. 8 shows a user 808 interacting with an instrumented object 830I. In this example, the instrumented object 830I is a toy car, which may have circuitry to communicate with the AR platform 105 and may also have circuitry (e.g., processors, memory, etc.) to control EMCs, such as a wheels to propel the toy car. Additionally, the binding 835 may act as, or emulate, a rope, string, rubber band, handle, or some other like connector.

At stage 1 the user 808 (represented by the hand and arm in FIG. 8) may cause a binding 835 to be generated by the AR platform 105 to bound with instrumented object 830I by performing a tap-hold gesture using an index finger at the instrumented object 830I, and dragging the tip of the index finger away from the instrumented object 830I. Once the index finger of the user 808 reaches a predetermined distance away from the instrumented object 830I or when the user 808 stops dragging the index finger, the AR platform 105 may set or establish the binding 835.

At stage 2, the user 808 may perform a pinch and hold gesture to indicate to interact or manipulate the binding 835 and/or instrumented object 830I. At stages 2-3, the user 808 may perform a dragging gesture, while continuing to perform the pinch and hold gesture, to move the instrumented object 830I using the binding 835. In stages 2-3, the AR platform 105 may send instructions to the instrumented object 830I that instructs the instrumented object 830I to take one or more actions while the user 808 performs the dragging gesture. In this example, the instructions may instruct the instrumented object 830I to activate its EMCs in order to propel the instrumented object 830I in a direction that corresponds with the dragging gesture.

Some non-limiting examples are as follows.

Example 1 may include a computer device employed in an augmented reality (AR) system, the computer device comprising: modeling circuitry to obtain first sensor data from a sensor array, wherein the first sensor data is representative of a physical environment and physical objects in the physical environment, and to track the physical objects in the physical environment based on the first sensor data; user input circuitry to obtain, from the sensor array, second sensor data that is representative of a gesture performed by a user; object recognition circuitry to identify a tracked physical object; AR circuitry to generate an instance of a virtual binding based on the identified physical object and the gesture, wherein the instance of the virtual binding has one or more virtual binding attributes that influence one or more actions to be performed by the virtual binding based on the identified physical object; and interface circuitry to provide the instance of the virtual binding to be displayed such that, upon display of the instance, the virtual binding is to appear to be attached to the physical object or appear to interact with the physical object.

Example 2 may include the computer device of example 1 and/or some other example herein, wherein the AR circuitry is to generate the instance of the virtual binding when the gesture is a gesture to indicate a selection of a particular virtual binding.

Example 3 may include the computer device of example 1 and/or some other example herein, wherein the AR circuitry is to obtain one or more object attributes of the physical object, and generate the instance of the virtual binding based on the one or more object attributes.

Example 4 may include the computer device of example 1 and/or some other example herein, wherein the instance is a selection instance, and wherein: the AR circuitry is to: generate an association instance of the virtual binding when the gesture is a gesture to indicate to associate the virtual binding with the physical object, and identify one or more virtual binding to physical object (VB-PO) attributes of the association of the virtual binding with the physical object; and the interface circuitry to provide the association instance of the virtual binding to be displayed, wherein the one or more VB-PO attributes are to indicate whether, upon display of the association instance, the virtual binding is to appear to be attached to the physical object or appear to interact with the physical object.

Example 5 may include the computer device of example 4 and/or some other example herein, wherein: the AR circuitry is to generate a PO-manipulate instance of the virtual binding when the gesture is a gesture to manipulate the virtual binding; and the interface circuitry to provide the PO-manipulate instance of the virtual binding to be displayed such that the virtual binding is to appear to be manipulated in response to performance of the gesture.

Example 6 may include the computer device of example 5 and/or some other example herein, further comprising: context circuitry to determine one or more contextual attributes, wherein the one or more contextual attributes comprise user activity, semantic location, social circumstances, ambient conditions, presence of one or more electronic devices, schedules, and user communications, wherein the AR circuitry is to generate the PO-manipulate instance based on the one or more contextual attributes.

Example 7 may include the computer device of examples 1-6 and/or some other example herein, wherein the instance is a selection instance, and wherein: the AR circuitry is to: generate a virtual object (VO) when the gesture is a gesture to indicate to select the VO, generate a VO instance of the virtual binding when the gesture is a gesture to indicate to associate the virtual binding with the VO, identify one or more virtual binding to VO (VB-VO) attributes of the association of the virtual binding with the VO, and generate a VO-manipulate instance of the virtual binding when the gesture is a gesture to manipulate the virtual binding; and the interface circuitry to: provide the VO and the VO instance of the virtual binding to be displayed, wherein the one or more VB-VO attributes are to indicate whether, upon display of the VO instance and the VO, the virtual binding is to appear to be attached to the VO or appear to interact with the VO, and provide the VO-manipulate instance of the virtual binding to be displayed such that the virtual binding is to appear to be manipulated in response to performance of the gesture to manipulate the virtual binding.

Example 8 may include the computer device of examples 1-7 and/or some other example herein, wherein the modeling circuitry is to generate a three-dimensional (3D) model of the physical environment, and wherein the object recognition circuitry to identify the physical object within the 3D model.

Example 9 may include the computer device of examples 1-8 and/or some other example herein, wherein the instance is a selection instance, and wherein: the AR circuitry is to: generate a instrumented object (IO) instance of the virtual binding when the gesture is a gesture to indicate to associate the virtual binding with an instrumented object, and identify one or more virtual binding to IO (VB-IO) attributes of the association of the virtual binding with the VO; and the interface circuitry to: cause a network connection to be established with the instrumented object, and provide the IO instance of the virtual binding to be displayed, wherein the one or more VB-IO attributes are to indicate whether, upon display of the IO instance, the virtual binding is to appear to be attached to the instrumented object or appear to interact with the instrumented object.

Example 10 may include the computer device of example 9 and/or some other example herein, wherein: the AR circuitry is to generate a IO-manipulate instance of the virtual binding when the gesture is a gesture to manipulate the virtual binding to act on the instrumented object; and the interface circuitry to: provide the IO-manipulate instance of the virtual binding to be displayed such that the virtual binding is to appear to be manipulated in response to performance of the gesture, and cause a message to be transmitted to the instrumented object over the network connection, wherein the instruction is to instruct the instrumented object to perform one or more actions in response to the manipulation of the virtual binding.

Example 11 may include one or more computer-readable media (CRM) comprising instructions, which when executed by one or more processors of a computer device, is to cause the computer device to: obtain first sensor data from a sensor array, wherein the first sensor data is representative of a physical environment; track physical objects in the physical environment based on the first sensor data; identify an object and object attributes associated with the identified object; obtain, from the sensor array, second sensor data that is representative of a gesture performed by a user; identify the gesture based on the second sensor data; generate, in response to identification of the gesture, an instance of a virtual binding based on the object attributes, wherein the instance of the virtual binding has one or more virtual binding attributes that influence one or more actions to be performed by the virtual binding; and provide the instance of the virtual binding to be displayed such that, upon display of the instance, the virtual binding is to appear to be attached to the object or appear to interact with the object.

Example 12 may include the one or more CRM of example 11 and/or some other example herein, wherein the instance of the virtual binding is a selection instance when the gesture is a gesture to indicate a selection of a particular virtual binding.

Example 13 may include the one or more CRM of example 11 and/or some other example herein, wherein execution of the instructions is to cause the computer device to obtain an object profile associated with the identified object, identify the object attributes from the object profile, and determine the virtual binding attributes based on the object attributes.

Example 14 may include the one or more CRM of example 11 and/or some other example herein, wherein the object is a physical object, and execution of the instructions is to cause the computer device to: generate an association instance of the virtual binding when the gesture is a gesture to indicate to associate the virtual binding with the physical object; identify one or more virtual binding to physical object (VB-PO) attributes of the association of the virtual binding with the physical object; and provide the association instance of the virtual binding to be displayed, wherein the one or more VB-PO attributes are to indicate whether, upon display of the association instance, the virtual binding is to appear to be attached to the physical object or appear to interact with the physical object.

Example 15 may include the one or more CRM of example 14 and/or some other example herein, wherein execution of the instructions is to cause the computer device to: generate a PO-manipulate instance of the virtual binding when the gesture is a gesture to manipulate the virtual binding; and provide the PO-manipulate instance of the virtual binding to be displayed such that the virtual binding is to appear to be manipulated in response to performance of the gesture and according to the virtual binding attributes.

Example 16 may include the one or more CRM of example 15 and/or some other example herein, wherein execution of the instructions is to cause the computer device to: determine one or more contextual attributes, wherein the one or more contextual attributes comprise user activity, semantic location, social circumstances, ambient conditions, presence of one or more electronic devices, schedules, and user communications; and generate the PO-manipulate instance based on the one or more contextual attributes.

Example 17 may include the one or more CRM of example 11 and/or some other example herein, wherein execution of the instructions is to cause the computer device to: generate a virtual object (VO) when the gesture is a gesture to indicate to select the VO; generate a VO instance of the virtual binding when the gesture is a gesture to indicate to associate the virtual binding with the VO; identify one or more virtual binding to VO (VB-VO) attributes of the association of the virtual binding with the VO; generate a VO-manipulate instance of the virtual binding when the gesture is a gesture to manipulate the virtual binding; provide the VO and the VO instance of the virtual binding to be displayed, wherein the one or more VB-VO attributes are to indicate whether, upon display of the VO instance and the VO, the virtual binding is to appear to be attached to the VO or appear to interact with the VO and in accordance with the virtual binding attributes; and provide the VO-manipulate instance of the virtual binding to be displayed such that the virtual binding is to appear to be manipulated in response to performance of the gesture and according to the virtual binding attributes.

Example 18 may include the one or more CRM of example 17 and/or some other example herein, wherein execution of the instructions is to cause the computer device to: generate a three-dimensional (3D) model of the physical environment for an AR environment based on the sensor data; and identify the physical object within the 3D model.

Example 19 may include the one or more CRM of example 11 and/or some other example herein, wherein execution of the instructions is to cause the computer device to: generate a instrumented object (IO) instance of the virtual binding when the gesture is a gesture to indicate to associate the virtual binding with an instrumented object; identify one or more virtual binding to IO (VB-IO) attributes of the association of the virtual binding with the VO; cause a network connection to be established with the instrumented object; and provide the IO instance of the virtual binding to be displayed, wherein the one or more VB-IO attributes are to indicate whether, upon display of the IO instance, the virtual binding is to appear to be attached to the instrumented object or appear to interact with the instrumented object and according to the virtual binding attributes.

Example 20 may include the one or more CRM of example 19 and/or some other example herein, wherein execution of the instructions is to cause the computer device to: generate a IO-manipulate instance of the virtual binding when the gesture is a gesture to manipulate the virtual binding to act on the instrumented object; provide the IO-manipulate instance of the virtual binding to be displayed such that the virtual binding is to appear to be manipulated in response to performance of the gesture; and cause a message to be transmitted to the instrumented object over the network connection, wherein the instruction is to instruct the instrumented object to perform one or more actions in response to the manipulation of the virtual binding.

Example 21 may include a method to be performed by a computer device, the method comprising: obtaining, by the computer device, first sensor data from a sensor array, wherein the first sensor data is representative of a physical environment; tracking, by the computer device, physical objects in the physical environment based on the first sensor data; identifying, by the computer device, an object within the physical environment and object attributes associated with the identified object; obtain, by the computer device from the sensor array, second sensor data that is representative of a gesture performed by a user; identifying, by the computer device, the gesture based on the second sensor data; generating, by the computer device in response to identification of the gesture, an instance of a virtual binding based on the object attributes, wherein the instance of the virtual binding has one or more virtual binding attributes that influence one or more actions to be performed by the virtual binding; and providing, by the computer device, the instance of the virtual binding to be displayed such that, upon display of the instance, the virtual binding is to appear to be attached to the object or appear to interact with the object.

Example 22 may include the method of example 21 and/or some other example herein, wherein the instance of the virtual binding is a selection instance when the gesture is a gesture to indicate a selection of a particular virtual binding.

Example 23 may include the method of example 21 and/or some other example herein, further comprising: obtaining, by the computer device, an object profile associated with the identified object; identifying, by the computer device, the object attributes from the object profile; and determining, by the computer device, the virtual binding attributes based on the object attributes.

Example 24 may include the method of example 21 and/or some other example herein, wherein the object is a physical object, and execution of the instructions is to cause the computer device to: generating, by the computer device, an association instance of the virtual binding when the gesture is a gesture to indicate to associate the virtual binding with the physical object; identifying, by the computer device, one or more virtual binding to physical object (VB-PO) attributes of the association of the virtual binding with the physical object; and providing, by the computer device, the association instance of the virtual binding to be displayed, wherein the one or more VB-PO attributes are to indicate whether, upon display of the association instance, the virtual binding is to appear to be attached to the physical object or appear to interact with the physical object.

Example 25 may include the method of example 24 and/or some other example herein, further comprising: generating, by the computer device, a PO-manipulate instance of the virtual binding when the gesture is a gesture to manipulate the virtual binding; and providing, by the computer device, the PO-manipulate instance of the virtual binding to be displayed such that the virtual binding is to appear to be manipulated in response to performance of the gesture and according to the virtual binding attributes.

Example 26 may include the method of example 25 and/or some other example herein, wherein execution of the instructions is to cause the computer device to: determining, by the computer device, one or more contextual attributes, wherein the one or more contextual attributes comprise user activity, semantic location, social circumstances, ambient conditions, presence of one or more electronic devices, schedules, and user communications; and generating, by the computer device, the PO-manipulate instance based on the one or more contextual attributes.

Example 27 may include the method of example 21 and/or some other example herein, further comprising: generating, by the computer device, a virtual object (VO) when the gesture is a gesture to indicate to select the VO; generating, by the computer device, a VO instance of the virtual binding when the gesture is a gesture to indicate to associate the virtual binding with the VO; identifying, by the computer device, one or more virtual binding to VO (VB-VO) attributes of the association of the virtual binding with the VO; generating, by the computer device, a VO-manipulate instance of the virtual binding when the gesture is a gesture to manipulate the virtual binding; providing, by the computer device, the VO and the VO instance of the virtual binding to be displayed, wherein the one or more VB-VO attributes are to indicate whether, upon display of the VO instance and the VO, the virtual binding is to appear to be attached to the VO or appear to interact with the VO and in accordance with the virtual binding attributes; and providing, by the computer device, the VO-manipulate instance of the virtual binding to be displayed such that the virtual binding is to appear to be manipulated in response to performance of the gesture and according to the virtual binding attributes.

Example 28 may include the method of example 27 and/or some other example herein, wherein execution of the instructions is to cause the computer device to: generating, by the computer device, a three-dimensional (3D) model of the physical environment for an AR environment based on the sensor data; and identifying, by the computer device, an object within the 3D model.

Example 29 may include the method of example 21 and/or some other example herein, wherein the instance is a first instance, and wherein execution of the instructions is to cause the computer device to: generating, by the computer device, a instrumented object (IO) instance of the virtual binding when the gesture is a gesture to indicate to associate the virtual binding with an instrumented object; identifying, by the computer device, one or more virtual binding to IO (VB-IO) attributes of the association of the virtual binding with the VO; establishing, by the computer device, a network connection with the instrumented object; and providing, by the computer device, the IO instance of the virtual binding to be displayed, wherein the one or more VB-IO attributes are to indicate whether, upon display of the IO instance, the virtual binding is to appear to be attached to the instrumented object or appear to interact with the instrumented object and according to the virtual binding attributes.

Example 30 may include the method of example 29 and/or some other example herein, wherein execution of the instructions is to cause the computer device to: generating, by the computer device, a IO-manipulate instance of the virtual binding when the gesture is a gesture to manipulate the virtual binding to act on the instrumented object; providing, by the computer device, the IO-manipulate instance of the virtual binding to be displayed such that the virtual binding is to appear to be manipulated in response to performance of the gesture; and transmitting, by the computer device, a message to the instrumented object over the network connection, wherein the instruction is to instruct the instrumented object to perform one or more actions in response to the manipulation of the virtual binding.

Example 31 may include an augmented reality (AR) system, comprising: an environment comprising a sensor array and an output device array, wherein the sensor array comprises one or more sensors and the output device array comprises one or more electromechanical devices; and an AR platform communicatively coupled with the sensor array and the output device array, the AR platform comprising: processor circuitry coupled with memory circuitry, communication circuitry, and interface circuitry, wherein the processor circuitry is to: control the interface circuitry or the communication circuitry to obtain first sensor data from the one or more sensors of the sensor array; track physical objects within the environment based on the first sensor data; identify an object within the 3D model and object attributes associated with the identified object; obtain second sensor data from the one or more sensors of the sensor array, wherein the second sensor data is representative of a gesture performed by a user; identify the gesture based on the second sensor data; generate, in response to identification of the gesture, an instance of a virtual binding based on the object attributes, wherein the instance of the virtual binding has one or more virtual binding attributes that influence one or more actions to be performed by the virtual binding; and control the interface circuitry or the communication circuitry to provide the instance of the virtual binding to an individual output device of the one or more output devices of the output device array, wherein the individual output device is to displayed the instance of the virtual binding such that, upon display of the instance, the virtual binding is to appear to be attached to the object or appear to interact with the object.

Example 32 may include the AR system of example 31 and/or some other example herein, wherein the instance of the virtual binding is a selection instance when the gesture is a gesture to indicate a selection of a particular virtual binding.

Example 33 may include the AR system of example 31 and/or some other example herein, wherein the processor circuitry is to obtain an object profile associated with the identified object, identify the object attributes from the object profile, and determine the virtual binding attributes based on the object attributes.

Example 34 may include the AR system of example 31 and/or some other example herein, wherein the processor circuitry is to: generate an association instance of the virtual binding when the gesture is a gesture to indicate to associate the virtual binding with the physical object; identify one or more virtual binding to physical object (VB-PO) attributes of the association of the virtual binding with the physical object; and control the interface circuitry or the communication circuitry to provide the association instance of the virtual binding to be displayed, wherein the one or more VB-PO attributes are to indicate whether, upon display of the association instance, the virtual binding is to appear to be attached to the physical object or appear to interact with the physical object.

Example 35 may include the AR system of example 34 and/or some other example herein, wherein the processor circuitry is to: generate a PO-manipulate instance of the virtual binding when the gesture is a gesture to manipulate the virtual binding; and control the interface circuitry or the communication circuitry to provide the PO-manipulate instance of the virtual binding to be displayed such that the virtual binding is to appear to be manipulated in response to performance of the gesture and according to the virtual binding attributes.

Example 36 may include the AR system of example 35 and/or some other example herein, wherein the processor circuitry is to: determine one or more contextual attributes, wherein the one or more contextual attributes comprise user activity, semantic location, social circumstances, ambient conditions, presence of one or more electronic devices, schedules, and user communications; and generate the PO-manipulate instance based on the one or more contextual attributes.

Example 37 may include the AR system of example 31 and/or some other example herein, the processor circuitry is to: generate a virtual object (VO) when the gesture is a gesture to indicate to select the VO; generate a VO instance of the virtual binding when the gesture is a gesture to indicate to associate the virtual binding with the VO; identify one or more virtual binding to VO (VB-VO) attributes of the association of the virtual binding with the VO; generate a VO-manipulate instance of the virtual binding when the gesture is a gesture to manipulate the virtual binding; control the interface circuitry or the communication circuitry to provide the VO and the VO instance of the virtual binding to be displayed, wherein the one or more VB-VO attributes are to indicate whether, upon display of the VO instance and the VO, the virtual binding is to appear to be attached to the VO or appear to interact with the VO and in accordance with the virtual binding attributes; and control the interface circuitry or the communication circuitry to provide the VO-manipulate instance of the virtual binding to be displayed such that the virtual binding is to appear to be manipulated in response to performance of the gesture and according to the virtual binding attributes.

Example 38 may include the AR system of example 37 and/or some other example herein, the processor circuitry is to: generate a three-dimensional (3D) model of the physical environment for an AR environment based on the sensor data; and identify the physical object within the 3D model.

Example 39 may include the AR system of example 31 and/or some other example herein, the processor circuitry is to: generate a instrumented object (IO) instance of the virtual binding when the gesture is a gesture to indicate to associate the virtual binding with an instrumented object; identify one or more virtual binding to IO (VB-IO) attributes of the association of the virtual binding with the VO; cause a network connection to be established with the instrumented object; and control the interface circuitry or the communication circuitry to provide the IO instance of the virtual binding to be displayed, wherein the one or more VB-IO attributes are to indicate whether, upon display of the IO instance, the virtual binding is to appear to be attached to the instrumented object or appear to interact with the instrumented object and according to the virtual binding attributes.

Example 40 may include the AR system of example 39 and/or some other example herein, the processor circuitry is to: generate a IO-manipulate instance of the virtual binding when the gesture is a gesture to manipulate the virtual binding to act on the instrumented object; control the interface circuitry or the communication circuitry to provide the IO-manipulate instance of the virtual binding to be displayed such that the virtual binding is to appear to be manipulated in response to performance of the gesture; and control the communication circuitry to transmit a message to the instrumented object over the network connection, wherein the instruction is to instruct the instrumented object to perform one or more actions in response to the manipulation of the virtual binding.

Example 41 may include a computer device employed in an augmented reality (AR) system, the computer device comprising: modeling means for generating a three-dimensional (3D) model of a physical environment based on the first sensor data, wherein the first sensor data is obtained from a sensor array; user input analysis means for determining user interactions based on second senor data obtained from the sensor array, second sensor data that is representative of user interactions of a user; object recognition means for identifying a physical object within the 3D model; AR means for generating an instance of a virtual binding based on the identified physical object and the gesture, wherein the instance of the virtual binding has one or more virtual binding attributes that influence one or more actions to be performed by the virtual binding based on the identified physical object; and display means for displaying the instance of the virtual binding to be displayed such that, upon display of the instance, the virtual binding is to appear to be attached to the physical object or appear to interact with the physical object.

Example 42 may include the computer device of example 41 and/or some other example herein, wherein the AR means is for generating the instance of the virtual binding when the gesture is a gesture to indicate a selection of a particular virtual binding.

Example 43 may include the computer device of example 41 and/or some other example herein, wherein the AR means is for obtaining one or more object attributes of the physical object, and for generating the instance of the virtual binding based on the one or more object attributes.

Example 44 may include the computer device of example 41 and/or some other example herein, wherein: the AR means is for generating an association instance of the virtual binding when the gesture is a gesture to indicate to associate the virtual binding with the physical object, and identifying one or more virtual binding to physical object (VB-PO) attributes of the association of the virtual binding with the physical object; and the display means is for displaying the association instance of the virtual binding to be displayed, wherein the one or more VB-PO attributes are to indicate whether, upon display of the association instance, the virtual binding is to appear to be attached to the physical object or appear to interact with the physical object.

Example 45 may include the computer device of example 44 and/or some other example herein, wherein: the AR means is for generating a PO-manipulate instance of the virtual binding when the gesture is a gesture to manipulate the virtual binding; and the display means is for displaying the PO-manipulate instance of the virtual binding to be displayed such that the virtual binding is to appear to be manipulated in response to performance of the gesture.

Example 46 may include the computer device of example 45 and/or some other example herein, further comprising: context means for determining one or more contextual attributes, wherein the one or more contextual attributes comprise user activity, semantic location, social circumstances, ambient conditions, presence of one or more electronic devices, schedules, and user communications, wherein the AR means is for generating the PO-manipulate instance based on the one or more contextual attributes.

Example 47 may include the computer device of example 41 and/or some other example herein, wherein the instance is a selection instance, and wherein: the AR means is for generating a virtual object (VO) when the gesture is a gesture to indicate to select the VO, generating a VO instance of the virtual binding when the gesture is a gesture to indicate to associate the virtual binding with the VO, and identifying one or more virtual binding to VO (VB-VO) attributes of the association of the virtual binding with the VO; and the display means is for displaying the VO and the VO instance of the virtual binding to be displayed, wherein the one or more VB-VO attributes are to indicate whether, upon display of the VO instance and the VO, the virtual binding is to appear to be attached to the VO or appear to interact with the VO.

Example 48 may include the computer device of example 47 and/or some other example herein, wherein: the AR means is for generating a VO-manipulate instance of the virtual binding when the gesture is a gesture to manipulate the virtual binding; and the display means is for displaying the VO-manipulate instance of the virtual binding to be displayed such that the virtual binding is to appear to be manipulated in response to performance of the gesture.

Example 49 may include the computer device of example 41 and/or some other example herein, wherein the instance is a selection instance, and wherein: the AR means is for generating a instrumented object (IO) instance of the virtual binding when the gesture is a gesture to indicate to associate the virtual binding with an instrumented object, and identifying one or more virtual binding to IO (VB-IO) attributes of the association of the virtual binding with the VO; and the display means is for displaying the IO instance of the virtual binding to be displayed, wherein the one or more VB-IO attributes are to indicate whether, upon display of the IO instance, the virtual binding is to appear to be attached to the instrumented object or appear to interact with the instrumented object, and the apparatus comprises communication means for establishing a network connection to be established with the instrumented object.

Example 50 may include the computer device of example 49 and/or some other example herein, wherein: the AR means is for generating a IO-manipulate instance of the virtual binding when the gesture is a gesture to manipulate the virtual binding to act on the instrumented object; and the display means is for displaying the IO-manipulate instance of the virtual binding to be displayed such that the virtual binding is to appear to be manipulated in response to performance of the gesture, and the communication means is for transmitting a message to the instrumented object over the network connection, wherein the instruction is to instruct the instrumented object to perform one or more actions in response to the manipulation of the virtual binding.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. A computer device employed in an augmented reality (AR) platform, the computer device comprising:
   modeling circuitry arranged to obtain first sensor data from a sensor array, wherein the first sensor data is representative of a physical environment and a physical object (PO) in the physical environment, and to track the PO in the physical environment based on the first sensor data;
   user input circuitry arranged to obtain, from the sensor array, second sensor data that is representative of a plurality of user inputs;
   object recognition circuitry arranged to identify a tracked PO;
   AR circuitry arranged to:
      generate a first instance of a virtual binding (VB) in response to a first user input of the plurality of user inputs, generation of the first instance of the VB is based on the identified PO and the first user input, wherein the first instance of the VB has one or more VB attributes that influence one or more actions to be performed by the VB with respect to the PO based on a relationship between the identified PO and the VB,
      generate a second instance of the VB in response to a second user input of the plurality of user inputs, wherein the second instance is representative of a manipulation of the VB, the second user input simulates a direct, physical manipulation of the VB and the manipulation is to cause the VB to act on the PO; and
   interface circuitry communicatively coupled with the AR circuitry, the interface circuitry is arranged to:
      provide the first instance of the VB to be displayed such that, upon display of the first instance, the VB is to appear to be attached to the PO, and
      provide the second instance of the VB to be displayed such that, upon display of the second instance, the VB is to appear to interact with the PO according to the manipulation and the one or more VB attributes, and cause a message to be transmitted to the PO over a network connection to instruct the PO to perform one or more actions in response to the manipulation of the VB.

2. The computer device of claim 1, wherein the AR circuitry is further arranged to generate the first or second instance of the VB when the first or second user input is a gesture to indicate a selection of a particular VB.

3. The computer device of claim 2, wherein the gesture is a drawing gesture performed by the user to indicate a size and shape of the VB, and the relationship between the identified PO and the VB is based on the size and shape of the VB and a position of the VB with respect to the PO.

4. The computer device of claim 2, wherein the first instance is a selection instance, the second instance is a VB to PO (VB-PO) association instance of the VB, and wherein:

the AR circuitry is further arranged to:
generate the VB-PO association instance of the VB when the second user input is a gesture to indicate to associate the VB with the PO, and
identify one or more VB-PO attributes of the association of the VB with the PO; and the interface circuitry is further arranged to provide the VB-PO association instance of the VB to be displayed, wherein the one or more VB-PO attributes indicate whether, upon display of the VB-PO association instance, the VB is to appear to be attached to the PO or appear to interact with the PO.

5. The computer device of claim 4, wherein the second instance is a PO-manipulate instance, and wherein:

the AR circuitry is further arranged to generate a PO-manipulate instance of the VB when the second user input is a gesture of interacting with the VB to manipulate the VB; and the interface circuitry is further arranged to provide the PO-manipulate instance of the VB to be displayed such that the VB is to appear to be manipulated in response to the second user input.

6. The computer device of claim 5, further comprising:

context circuitry arranged to determine one or more contextual attributes, wherein the one or more contextual attributes comprise user activity, semantic location, social circumstances, ambient conditions, presence of one or more electronic devices, schedules, and user communications, wherein the AR circuitry is arranged to generate the PO-manipulate instance based on the one or more contextual attributes.

7. The computer device of claim 5, wherein the interface circuitry is further arranged to:

cause the message to be transmitted to the PO over the network connection in response to the second user input.

8. The computer device of claim 1, wherein the first instance is a selection instance, the second instance is a VO-manipulate instance of the VB, and wherein:

the AR circuitry is further arranged to:
generate a virtual object (VO) when the first user input is a gesture indicating selection of the VO,
generate a VB to VO (VB-VO) association instance of the VB when a third user input of the plurality of user inputs is a gesture indicating to associate the VB with the VO,
identify one or more VB-VO attributes of the association of the VB with the VO, and
generate the VO-manipulate instance of the VB when the second gesture is a gesture to manipulate the VB; and the interface circuitry is further arranged to:
provide the VO and the VB-VO association instance of the VB to be displayed, wherein the one or more VB-VO attributes indicate whether, upon display of the VB-VO association instance and the VO, the VB is to appear to be attached to the VO or appear to interact with the VO, and
provide the VO-manipulate instance of the VB to be displayed such that the VB is to appear to be manipulated in response to performance of the gesture to manipulate the VB.

9. The computer device of claim 1, wherein the modeling circuitry is further arranged to generate a three-dimensional (3D) model of the physical environment, and wherein the object recognition circuitry is arranged to identify the PO within the 3D model.

10. The computer device of claim 4, wherein the interface circuitry is further arranged to:

cause a network connection to be established with the PO; and provide a VB-PO instance of the VB to be displayed, wherein the more VB-PO attributes indicate whether, upon display of the VB-PO instance, the VB is to appear to be attached to the PO or appear to interact with the PO.

11. One or more non-transitory computer-readable media (NTCRM) comprising instructions, wherein execution of the instructions by one or more processors of a computer device is to cause the computer device to:

obtain first sensor data from a sensor array, wherein the first sensor data is representative of a physical environment and an instrumented object (IO) in the physical environment;

detect the IO in the physical environment based on the first sensor data;

identify the IO and IO attributes associated with the identified IO;

obtain, from the sensor array, second sensor data that is representative of gestures performed by a user;

generate, in response to identification of a first gesture of the gestures represented by the second sensor data, a first instance of a virtual binding (VB) based on the PO attributes, wherein the instance of the VB has one or more VB attributes that influence one or more actions to be performed by the VB, the VB attributes being based on a relationship between the identified IO and the VB;

generate a second instance of the VB, in response to identification of a second gesture of the gestures represented by the second sensor data, the second instance is representative of manipulation of the VB, the second gesture simulates a direct, physical manipulation of the VB, and the manipulation is to cause the VB to act on the IO;

provide the first instance of the VB to be displayed such that, upon display of the first instance, the VB is to appear to be attached to the IO; and provide the second instance of the VB to be displayed such that, upon display of the second instance, the VB is to appear to interact with the IO based on the manipulation and the one or more VB attributes; and cause a message to be transmitted to the IO over a network connection to instruct the IO to perform one or more actions in response to the manipulation of the VB.

12. The one or more NTCRM of claim 11, wherein the first instance of the VB is a selection instance when the first gesture is a gesture to indicate a selection of a particular VB.

13. The one or more NTCRM of claim 11, wherein execution of the instructions is to cause the computer device to:
obtain an IO profile associated with the identified IO;
identify the IO attributes from the IO profile; and
determine the VB attributes based on the IO attributes.

14. The one or more NTCRM of claim 11, wherein execution of the instructions is to cause the computer device to:
establish a network connection with the IO.

15. The one or more NTCRM of claim 14, wherein the second instance is an IO manipulate instance of the VB, and execution of the instructions is to cause the computer device to:
generate the IO manipulate instance of the VB when the second gesture is a gesture of interacting with the VB to manipulate the VB;
provide the IO manipulate instance of the VB to be displayed such that the VB is to appear to be manipulated in response to performance of the second gesture and according to the VB attributes; and
cause the message to be transmitted to the 10 over the network connection in response to detection of a third gesture.

16. A method to be performed by a computer device, the method comprising:
obtaining, by the computer device, first sensor data from a sensor array, wherein the first sensor data is representative of a physical environment;
generating, by the computer device, a three-dimensional (3D) model of the physical environment for an AR environment based on the first sensor data;
identifying, by the computer device, a physical object (PO) within the 3D model and PO attributes associated with the identified PO;
obtaining, by the computer device from the sensor array in response to detection of each gesture performed by a user, second sensor data that is representative the detected gestures performed by the user;
generating, by the computer device in response to identification of a first gesture of the detected gestures, a first instance of a virtual binding (VB) based on the PO attributes, wherein the first instance of the VB has one or more VB attributes that influence one or more actions to be performed by the VB, the VB attributes being based on a relationship between the identified PO and the VB;
generating, by the computer device in response to identification of a second gesture of the detected gestures, a second instance of the VB that is representative of manipulation of the VB, wherein the second gesture simulates a direct, physical manipulation of the virtual binding, and the manipulation is to cause the VB to act on the PO;
providing, by the computer device, the first instance of the VB to be displayed such that, upon display of the first instance, the VB is to appear to be attached to the PO; and
providing the second instance of the VB to be displayed such that, upon display of the second instance, the VB is to appear to interact with the PO based on the manipulation and the one or more VB attributes; and
sending a message to the PO over a network connection to instruct the PO to perform one or more actions in response to the manipulation of the VB.

17. The method of claim 16, wherein the first instance is a VB to VO (VB-VO) association instance, and the method further comprises:
generating, by the computer device, a virtual object (VO) in response to identification of a VO generation gesture of the detected gestures, wherein the VO generation gesture is a gesture to indicate to select the VO;
generating, by the computer device, the VB-VO association instance of the VB when the first gesture is a gesture to indicate to associate the VB with the VO;
identifying, by the computer device, one or more VB-VO attributes of the association of the VB with the VO; and
providing, by the computer device, the VO and the VB-VO instance of the VB to be displayed, wherein the one or more VB-VO attributes are to indicate whether, upon display of the VB-VO instance and the VO, the VB is to appear to be attached to the VO or appear to interact with the VO and in accordance with the one or more VB-VO attributes.

18. The method of claim 17, wherein the second instance is a VO-manipulate instance, and the method further comprises:
generating, by the computer device, the VO-manipulate instance of the VB when the second gesture is a gesture to manipulate the VB; and
providing, by the computer device, the VO-manipulate instance of the VB to be displayed such that the VB is to appear to be manipulated in response to performance of the gesture and according to the VB attributes.

19. The method of claim 16, wherein to the method further comprises:
establishing, by the computer device, a network connection with the PO; and
providing, by the computer device, a VB-PO instance of the VB to be displayed, wherein the one or more PO attributes are to indicate whether, upon display of the VB-PO instance, the VB is to appear to be attached to the PO or appear to interact with the PO and according to the VB attributes.

20. The method of claim 19, wherein the second instance is an PO manipulate instance, and the method further comprises:
generating, by the computer device, the PO-manipulate instance of the VB when the second gesture is a gesture to manipulate the VB to act on the PO;
providing, by the computer device, the PO manipulate instance of the VB to be displayed such that the VB is to appear to be manipulated in response to performance of the gesture; and
transmitting, by the computer device, a message to the PO over the network connection, wherein the message is to instruct the POW to perform one or more actions in response to the manipulation of the VB.

21. An augmented reality (AR) system, comprising:
an environment comprising a sensor array and an output device array, wherein the sensor array comprises one or more sensors and the output device array comprises one or more electromechanical devices; and
an AR platform communicatively coupled with the sensor array and the output device array, the AR platform comprising: processor circuitry coupled with memory circuitry, communication circuitry, and interface circuitry, wherein the processor circuitry is arranged to:
control the interface circuitry or the communication circuitry to obtain first sensor data from the one or more sensors of the sensor array;
generate a three-dimensional (3D) model of the environment based on the first sensor data;
identify a physical object (PO) within the 3D model and PO attributes associated with the identified PO;
obtain, in response to each detected gesture by the one or more sensors, second sensor data from the one or more sensors of the sensor array, wherein the second sensor data is representative of individual gestures performed by a user;
generate, in response to identification of a first gesture represented by the second sensor data, a first instance of a virtual binding (VB) based on the PO attributes, wherein the instance of the VB has one or more VB attributes that influence one or more actions to be performed by the VB, the VB attributes being based on a relationship between the identified PO and the VB;
generate, in response to identification of a second gesture represented by the second sensor data, a second instance of the VB that is representative of a manipulation of the VB wherein the second gesture simulates a direct, physical manipulation of the virtual binding, and the manipulation is to cause the VB to act on the PO;
identify one or more VB to PO (VB-PO) attributes of the association of the VB with the IO;
cause a network connection to be established with the PO; and
the interface circuitry or the communication circuitry is arranged to:
provide a PO instance of the VB to be displayed, wherein the one or more VB-PO attributes are to indicate whether, upon display of the PO instance, the VB is to appear to be attached to the PO or appear to interact with the PO and according to the VB attributes, and
transmit a message to the PO over the network connection, the message to instruct the PO to perform one or more actions in response to the manipulation of the VB;
control the interface circuitry or the communication circuitry to provide the first instance of the VB to an individual output device of one or more output devices of the output device array, wherein the individual output device is to display the first instance of the VB such that, upon display of the first instance, the VB is to appear to be attached to the PO or appear; and
control the interface circuitry or the communication circuitry to provide the second instance of the VB to the individual output device or another output device of the one or more output devices of the output device array, wherein the individual output device or the other output device is to display the second instance of the VB such that, upon display of the second instance, the VB is to appear to interact with the PO based on the manipulation and the one or more VB attributes.

22. The AR system of claim 21, wherein the first instance is a VB to PO (VB-PO) association instance of the VB, the second instance is PO-manipulate instance, and wherein the processor circuitry is arranged to:
generate a VB-PO association instance of the VB when the first gesture is a gesture to indicate to associate the VB with the PO;
identify one or more VB-PO attributes of the association of the VB with the PO; and
control the interface circuitry or the communication circuitry to provide the VB-PO association instance of the VB to be displayed, wherein the one or more VB-PO attributes indicate whether, upon display of the association instance, the VB is to appear to be attached to the PO or appear to interact with the PO;
generate the PO-manipulate instance of the VB when the second gesture is a gesture to manipulate the VB; and
control the interface circuitry or the communication circuitry to provide the PO-manipulate instance of the VB to be displayed such that the VB is to appear to be manipulated in response to performance of the gesture and according to the VB attributes.

23. The AR system of claim 21, wherein the second instance is a virtual object (VO)-manipulate instance, and the processor circuitry is arranged to:
identify one or more VB to VO (VB-VO) attributes based on an association of the VB with a VO displayed by at least one of the one or more output devices, wherein the one or more VB-VO attributes indicate whether, upon display of a VB-VO association instance and an instance of the VO, the VB is to appear to be attached to the VO or appear to interact with the VO;
generate the VO-manipulate instance of the VB when the second gesture is a gesture to manipulate the VB;
control the interface circuitry or the communication circuitry to provide an instance of the VO and a VB-VO association instance of the VB to be displayed, and
provide the VO-manipulate instance of the VB to be displayed such that the VB is to appear to be manipulated in response to performance of the gesture to manipulate the VB; and
control the interface circuitry or the communication circuitry to provide the VO-manipulate instance of the VB to be displayed such that the VB is to appear to be manipulated in response to performance of the gesture and according to the VB attributes.

24. The AR system of claim 21, wherein the processor circuitry is arranged to:
cause a network connection to be established with the PO.

25. The AR system of claim 24, wherein the first gesture includes one or both of one or more movements of one or more body parts and one or more voice commands, and the second gesture includes one or both of one or more movements of one or more body parts and one or more voice commands.

* * * * *

UNITED STATES PATENT AND TRADEMARK OFFICE
CERTIFICATE OF CORRECTION

PATENT NO. : 10,937,240 B2  
APPLICATION NO. : 15/862280  
DATED : March 2, 2021  
INVENTOR(S) : Glen J. Anderson Page 1 of 1

It is certified that error appears in the above-identified patent and that said Letters Patent is hereby corrected as shown below:

In the Claims

Column 39  
Line 29 "...to the 10 over..." should read "...to the IO over..."

Column 40  
Line 36, "...claim 16, wherein to the method..." should read "...claim 16, wherein the method..."

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*